United States Patent [19]

Hiramoto

[11] Patent Number: 5,471,476
[45] Date of Patent: Nov. 28, 1995

[54] SYNCHRONOUS PAYLOAD POINTER PROCESSING SYSTEM IN DIGITAL DATA TRANSMISSION NETWORK

[75] Inventor: Masanori Hiramoto, Kawasaki, Japan

[73] Assignee: Fujitsu Limited, Kanagawa, Japan

[21] Appl. No.: 283,657

[22] Filed: Aug. 1, 1994

Related U.S. Application Data

[63] Continuation of Ser. No. 894,025, Jun. 5, 1992, abandoned.

[30] Foreign Application Priority Data

Jun. 5, 1991 [JP] Japan .................................... 4-145988
Jun. 6, 1991 [JP] Japan .................................... 3-135119

[51] Int. Cl.[6] .................................................. H04J 3/06
[52] U.S. Cl. ......................... 370/105.1; 370/105.4; 370/110.1; 375/372
[58] Field of Search ..................... 370/55, 84, 100.1, 370/101, 102, 105.1, 105.4, 112, 110.1; 375/112, 118, 354, 371, 372

[56] References Cited

U.S. PATENT DOCUMENTS

| | | | |
|---|---|---|---|
| 5,067,126 | 11/1991 | More | 370/102 |
| 5,111,485 | 5/1992 | Serack | 370/101 |
| 5,113,395 | 5/1992 | Murakami | 370/105.1 |
| 5,142,529 | 8/1992 | Parruck et al. | 370/84 |
| 5,172,376 | 12/1992 | Chopping et al. | 370/100.1 |

FOREIGN PATENT DOCUMENTS

| | | |
|---|---|---|
| 2193430 | 7/1990 | Japan . |
| 3230651 | 10/1991 | Japan . |
| 3278734 | 12/1991 | Japan . |
| 3278735 | 12/1991 | Japan . |

*Primary Examiner*—Hassan Kizou

[57] ABSTRACT

A synchronous payload processing system in a synchronous transmission network for transmitting information in SONET or CCITT signals includes a pointer detection unit which monitors a group of pointer bytes in a receive multiplex signal applied thereto and determines pointer values in that group of the pointer bytes monitored. A storage unit also receives the multiplex signal and stores payload data carried thereby. A write timing signal generator unit is coupled to the pointer detection unit and to the storage unit to provide thereto a write clock signal generated in response to a receive clock signal applied to the write timing generator unit. A read timing signal generator unit generates a read clock signal supplied to the storage unit. A phase difference counter unit counts a phase difference between a receive frame timing signal and a transmit frame timing signal supplied thereto and applies that phase difference to a pointer detection unit which is also coupled to the storage unit and to a phase comparator which produces a control signal applied to and processed in the pointer addition unit which produces a new group of pointer values and adds overhead bytes thereof to payload data from the storage unit to generate a transmit multiplex signal.

3 Claims, 21 Drawing Sheets

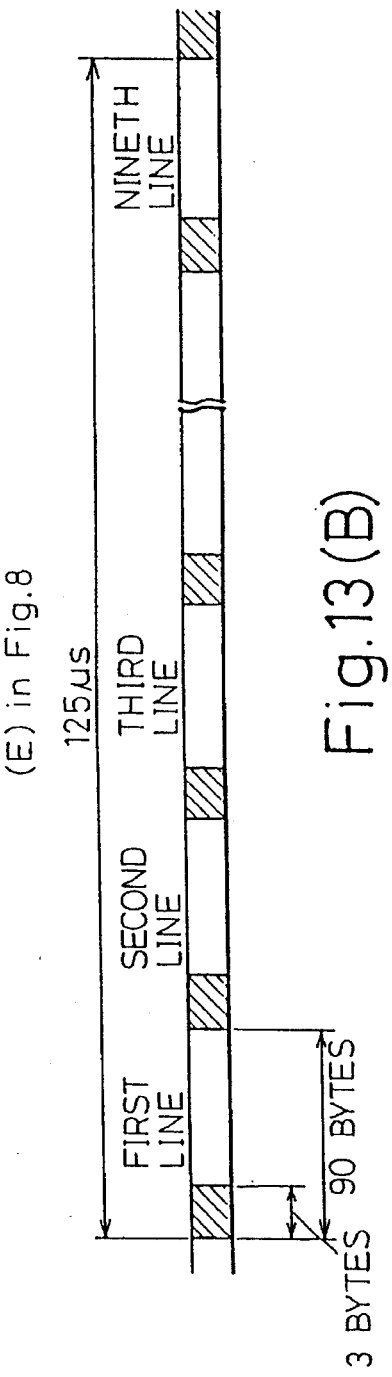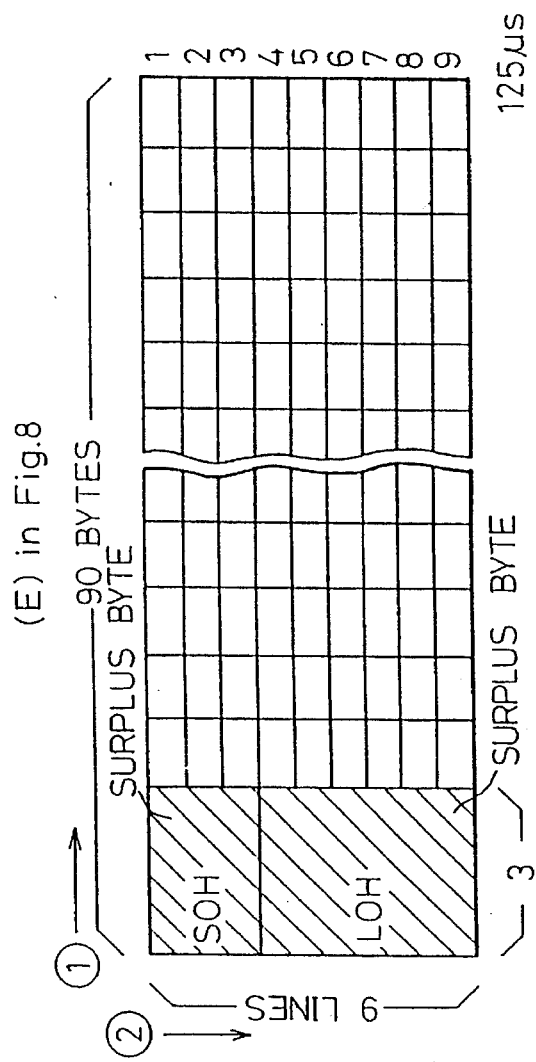

SYNCHRONOUS PAYLOAD POINTER PROCESSING SYSTEM IN DIGITAL DATA TRANSMISSION NETWORK

This is a continuation, of application Ser. No. 07/894,025 filed Jun. 5, 1992, now abandoned.

BACKGROUND OF THE INVENTION

1. Field of the Invention

The present invention relates to a payload pointer processing system responsive to a synchronous payload envelope in a digital data transmission network, and more particularly to a system in which a plurality of payloads are lumped together to form an appropriate number of group units and pointer processing is effected by every group unit and a shared control of storage in a pointer processing device leads to a reduction of multiconversion units to curtail the scale of a pointer processing circuit.

2. Description of the Related Arts

In an internationally standardized synchronous optical transmission device such as by CCITT (Comité Consultatif International Télégraphique et Téléphonique) and SONET (Synchronous Optical Network), it is requested for the above-described device that a synchronous payload envelope be used to be regarded as a transmission unit to transmit information, and the assignment of a timely location or a time slot, with regard to a plurality of synchronous payload envelopes, is carried out to multiplex therewith. In the payload pointer processing system in response to such a synchronous payload envelope it is requested that the processing system be constituted such that the scale of the pointer processing circuit can be reduced.

As for the payload pointer, in internationally standardized synchronous optical transmission equipment, it is recommended by the international standard to be capable of efficiently processing the payload envelope with regard to time and hardware.

When a plurality of payload envelopes such that a frame phase is not mutually defined is byte-multiplexed, the payload pointer is defined in a superframe structure for transmitting a payload envelope. That is, the frame structure in this case is formed by the payload envelope as well as a surplus byte (overhead byte) that includes the payload pointer value, or the like, that shows where the head position of the payload envelope is present in the designated frame structure or mapping, viz., an overhead byte (for example, in the case of a VT superframe, it is regarded as V1 to V4).

Since a circuit for performing a pointer processing is necessitated by a number of the payloads, when a large number of payloads are converted in a multi-fold way or in the case of a transmission device that new inserted payloads and a group of received payloads are combined and assigned again, it is necessary to prepare a great number of pointer processing circuits and it is inevitable that the scale of the circuit be increased. Further, even in a transmission device that is applied to a synchronized network, since a fluctuation such as a wander or jitter exists, it is quite difficult to carry out a payload pointer processing and realize a multiplexer or a relocation equipment.

SUMMARY OF THE INVENTION

In order to solve the problems in the prior art the present invention has been devised.

An object of the present invention is provide a payload pointer processing system responsive to a synchronous payload envelope in a digital data communication network in which the pointer processing is not effected at every payload unit, but a plurality of payloads are lumped together to form an appropriate number of group units and the pointer processing is effected at every appropriate number of group units; a memory unit is shared so as to avoid the influence of a fluctuation of frequency, such as a wander or jitter with which a pointer processing circuit is attended; since a separation unit is not necessary, a multi-conversion unit is simplified; and the scale of the circuit in the whole pointer processing circuit can be reduced.

In accordance with a feature of the present invention, there is provided a synchronous payload pointer processing system including: a pointer detection unit for dropping a surplus byte in each synchronous payload envelope in a multiplexing state of a plurality of synchronous payload envelopes that are separated up to the minimum level and processed for a received signal to recognize the head position of each synchronous payload envelope from a pointer value included in said surplus byte; a storage unit for writing/reading each synchronous payload envelope in response to each write/read clock; a phase difference counter for counting the phase difference between a frame timing of a received signal and a reference frame timing; and a pointer addition unit for adding a new surplus byte having a pointer value that attains the same phase as the reference frame with regard to a plurality of synchronous payload envelopes read from said storage unit and responsive to the resultant value such that a head position value of said synchronous payload envelope of said received signal recognized at said pointer detection unit and a phase difference value counted at said phase difference counter are added, to thereby form a synchronous payload envelope signal.

BRIEF DESCRIPTION OF THE DRAWINGS

FIGS. 13(A) and 13(B) form a view showing an operation and a frame structure of a STS-1 signal, such as (E) in FIG. 8;

PREFERRED EMBODIMENTS OF THE INVENTION

With reference to the drawings, the payload pointer processing system in accordance with the present invention will be described in conjunction with the conventional art.

Figure 1:
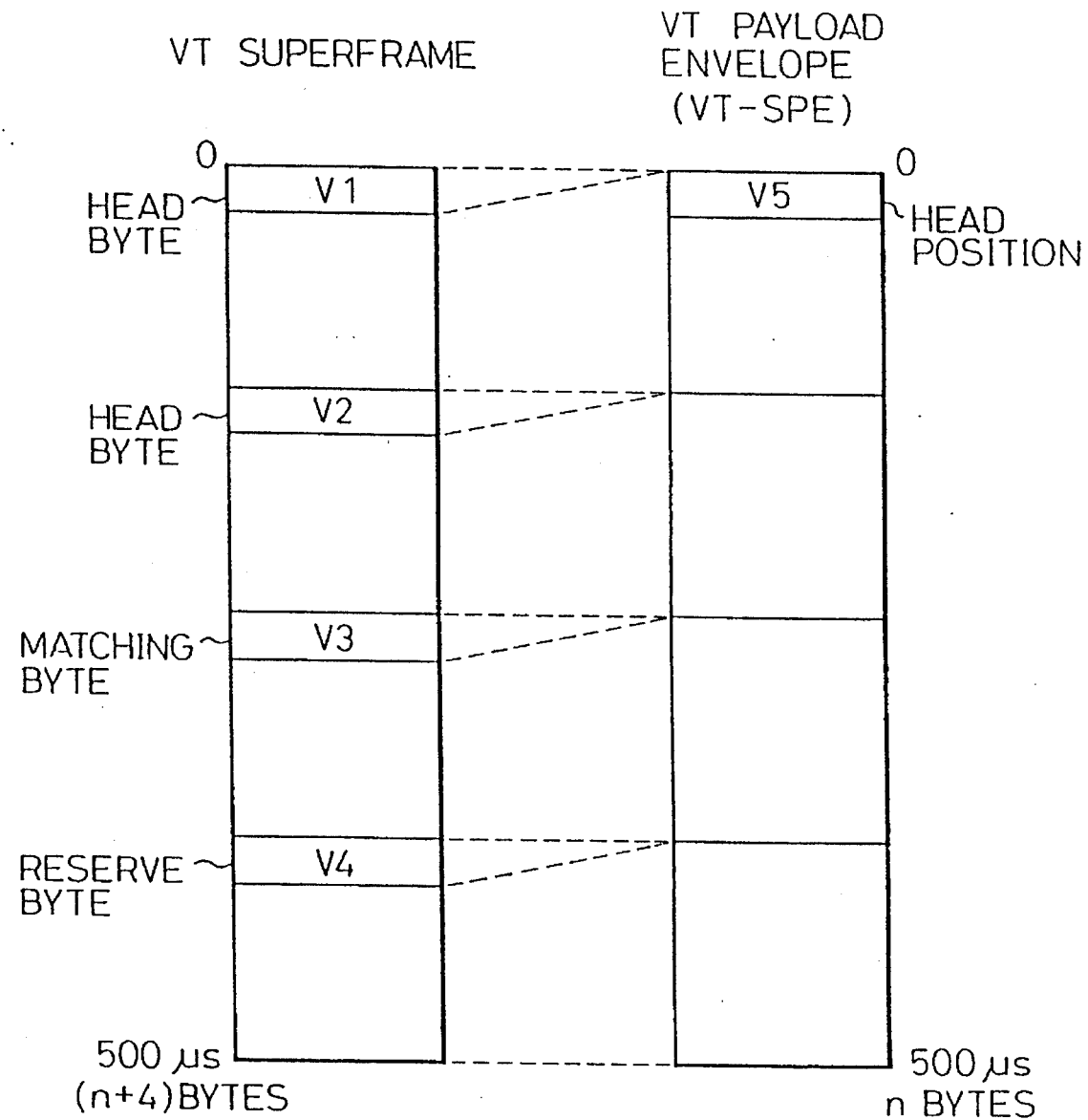
FIG. 1 is a view showing a superframe of a VT payload envelope.

FIG. 1 is a view showing a superframe of the VT payload envelope.

In FIG. 1, the VT payload envelope (VT-SPE) is mapped based on a multiplexed unit of a floating VT (Virtual Tributary) recommended by the SONET specification. In the case of a floating VT, the position of a head byte V5 of the VT payload envelope is displayed in VT pointer bytes (V1, V2) on the VT mapping. V3 is a matching byte and V4 is a reserve byte. The VT payload envelope of n bytes of 500 μs is transmitted by n bytes except for surplus bytes V1 to V4 within the (n+4) bytes of 500 μs of VT mapping. In this case, each time slot of n bytes except for V1 to V4 bytes within the VT mapping is numbered and the position where the head byte (V5) of the VT payload envelope is present, is indicated as a pointer value in the VT pointer byte by the corresponding number. Therefore, the position of V5 in the VT mapping is free and can easily be detected.

Figure 2:
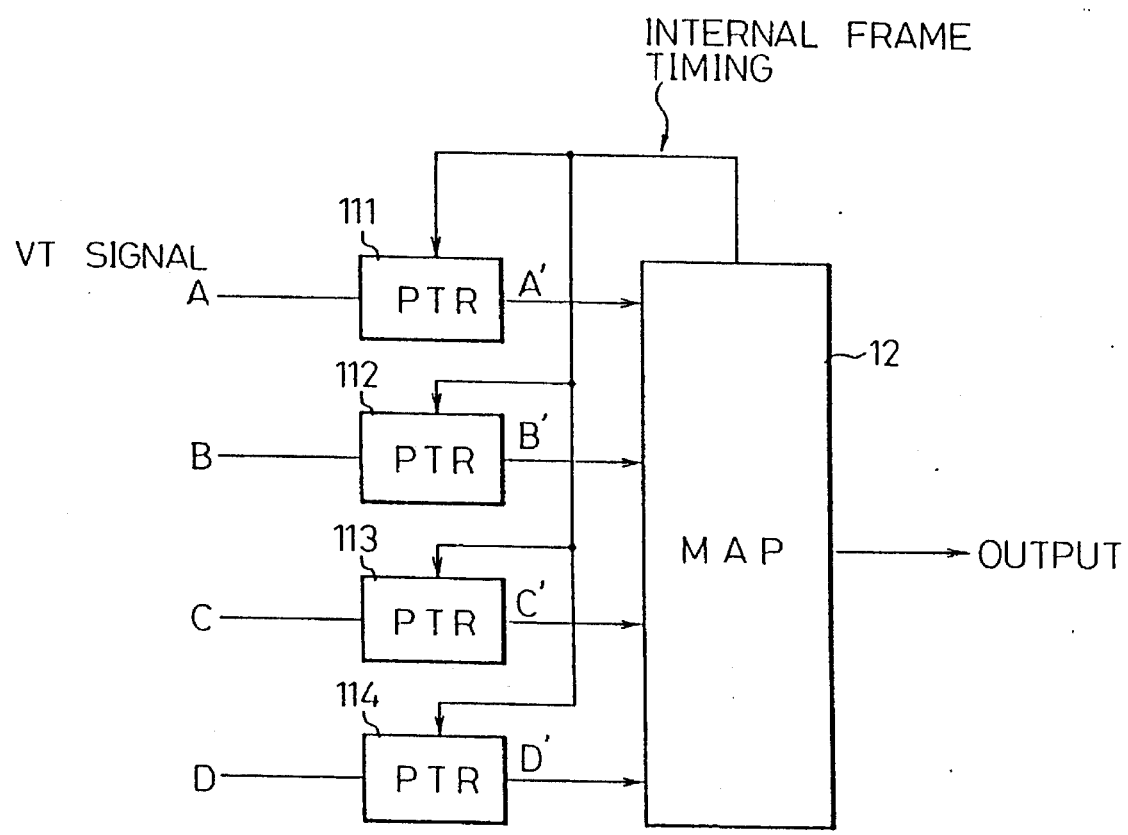
FIG. 2 is a view showing a pointer processing circuit matching a frame timing of a plurality of VT signals with an internal frame timing.

FIG. 2 is a schematic block diagram showing an outline of the pointer processing circuit that matches a frame timing of a plurality of VT signals with an internal frame timing. In FIG. 2, the frame structure of data output from a MAP portion 12 is prescribed. Nevertheless, the frame timing of the input VT signals A to D having the same frame period is arbitrary, respectively, and cannot be defined. If the four kinds of VT signals that are input by an arbitrary frame timing are pointer-processed in the pointer processing units 111 to 114, they are matched with the internal frame timing to be input to the MAP portion 12 and form a frame structure of output data. The above pointer processing is a well-known art that can realize a timing matching effectively. In the above case, pointer processing by means of VT signals is described, but it is also applicable to the case of a high order group level of signals.

Figure 3:
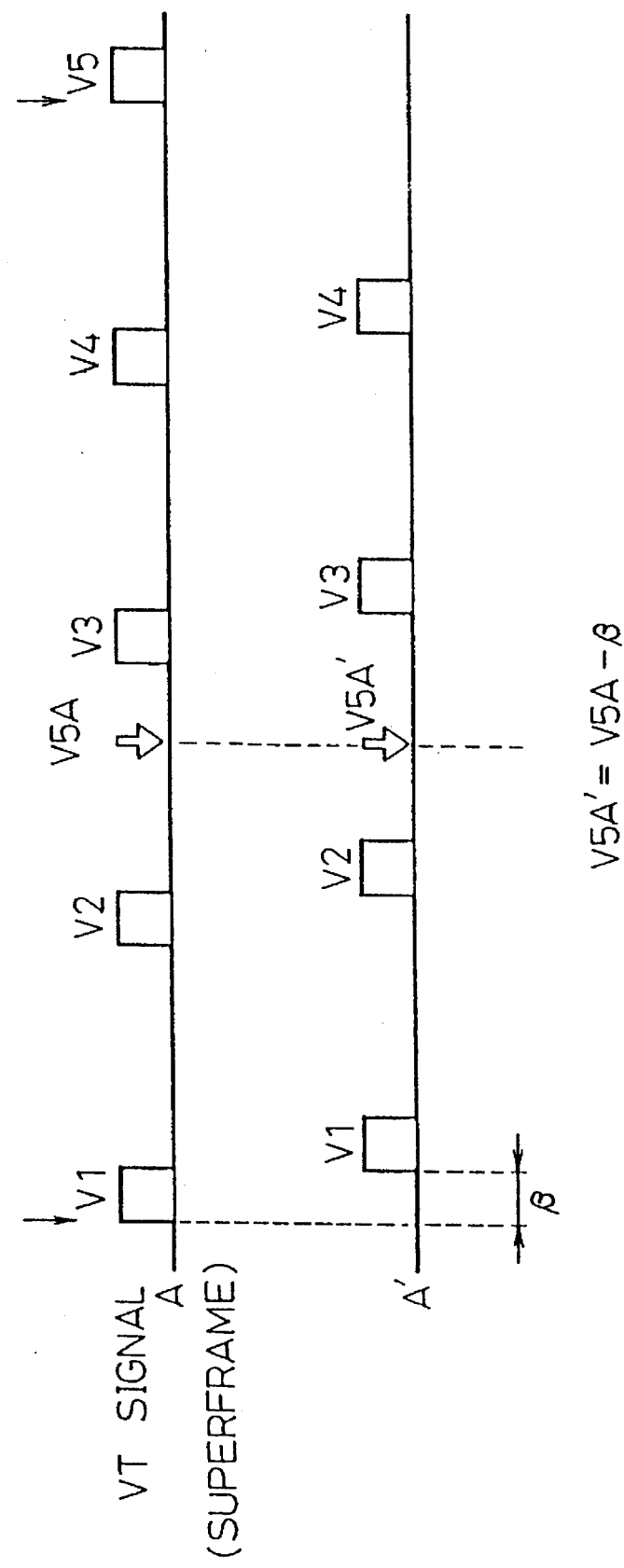
FIG. 3 is a view showing a transfer of frame timing by pointer processing.

FIG. 3 is a view showing a transfer of frame timing by the pointer processing. A pointer value V5A indicated by V1 and V2 of a VT signal (superframe) that is input by an arbitrary frame timing is converted into an internal frame timing to obtain a new pointer value V5A'. Then,

V5A'=V5A—β where β is a value such that a phase difference between frames is indicated by a byte number. Based on the conversion, the structure of a VT signal within a superframe is not operated so as to be transferred to the internal frame timing.

When the frame structure shown in FIG. 1 is provided and several payload envelopes such that a frame phase is not mutually defined, are byte-multiplexed, the payload pointer value indicated by each surplus byte as a prior processing is extracted to recognize thereof. The surplus byte terminates at this time. A relative phase difference β between the payload pointer value and the reference phase position of a superframe is derived by an addition or a subtraction. As for the reference phase position of the frame, the frame position after being multiplexed is usually used. The pointer value obtained by the relative phase difference β is regarded as a new payload pointer value of the relevant payload envelope, which is inserted thereinto with other surplus bytes to form a new frame. The calculation of the frame phase difference and the insertion of a new payload pointer value are carried out with regard to all payload envelopes to be multiplexed. Based on the processing, the phase position of all payload envelopes to be multiplexed coincides with the reference frame position. In other words, a value that the payload pointer value of all payload envelopes to be multiplexed indicates, denotes a head position of the payload envelope compared with the reference frame position.

In the last step, a frame, including several payload envelopes that these frame positions coincide therewith, is multiplexed (byte-interleavedly multiplexed) in a defined order of every byte unit, and a defined frame after multiplexed is formed. "Pointer processing" means a processing from the recognition of a pointer value effected in the step prior to the insertion of a new pointer value.

Figure 4:
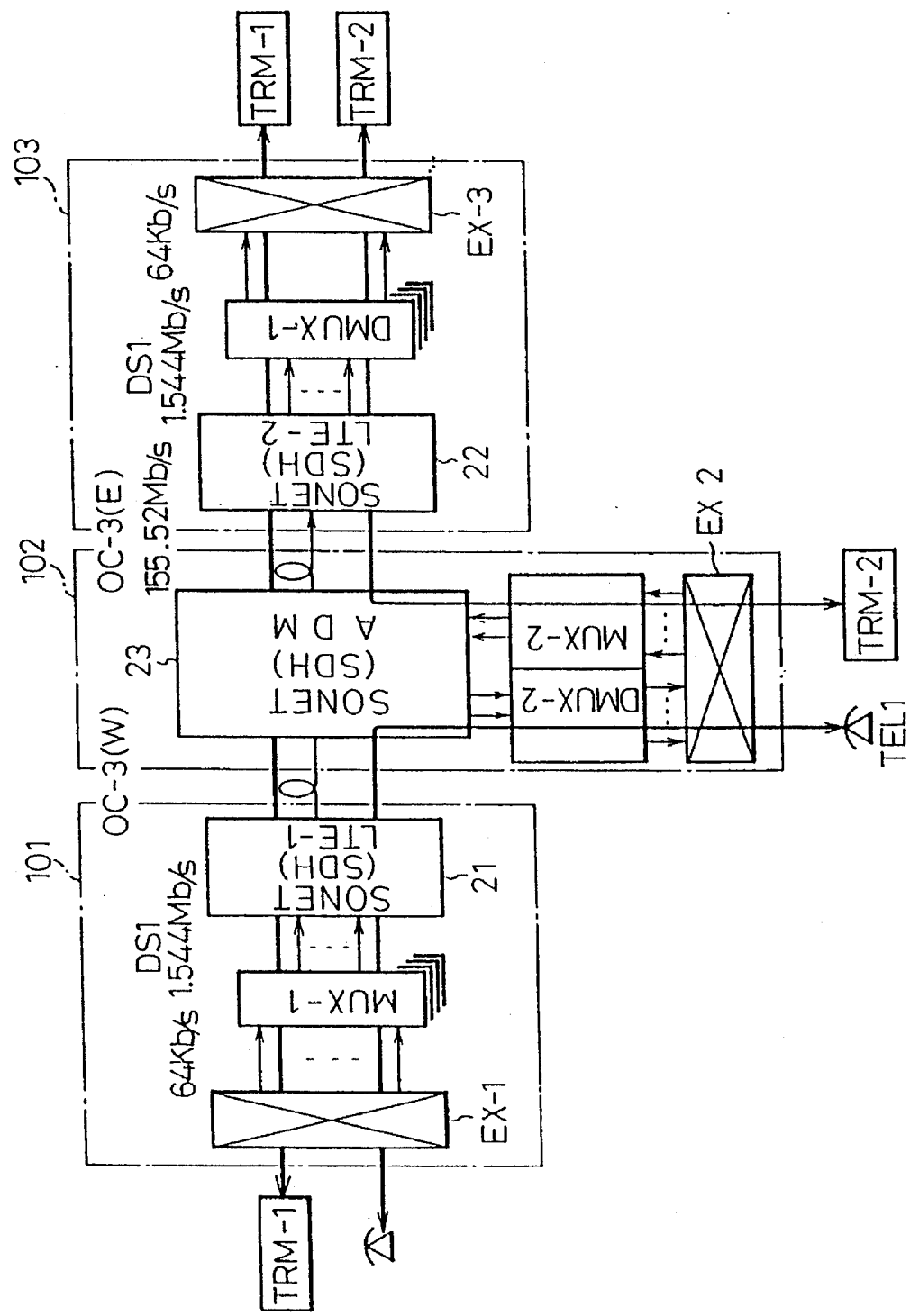
FIG. 4 is a schematic diagram showing a SONET optical transmission system for rearranging a payload.

FIG. 4 is a schematic diagram showing a system structure explaining the principal operation of SONET optical transmission equipment for relocating a payload. The system includes a short-distance station (CO station) 101, an intermediate station (HUB station) 102, and a long-distance station (RT station) 103. The multiplexed voice signals TEL1 and TRM-1 are sent to a HUB station 102 via a CO station 101, a TEL-1 is output via the HUB station 102 and is capable of communicating with a CO station 101; a TRM-1 signal is output via the HUB station 102 and the RT station 103 to communicate with the CO station 101, and a TRM-2 signal is output from the HUB station 102 via the RT station 103 to communicate with the RT station 103.

The CO station 101 is formed by an exchange EX-1, a multiplexer MUX-1, and a synchronous optical signal termination unit (SONET-LTE-1). The HUB station 102 is formed by a synchronous optical signal relocation device SONET-ADM, a demultiplexer DMUX-1, a multiplexer MUX-2, and an exchange unit EX-2. The RT station 103 is formed by a synchronous optical signal terminating unit SONET-LTE-2, a demultiplexer DMUX-2 and an exchange unit EX-3.

In FIG. 4, an LTE mode device such as LTE-1 and LTE-2 is used to effect a large operation mode of the SONET optical transmission device. In the LTE mode device, such as the CO station 101 and the RT station 103, a voice signal that is digitally processed to 64 Kb/s or a data signal is interfaced to an optical transmission line. An ADM mode device such as the HUB station 102 is provided with a relocation function that arbitrarily adds or drops a signal in the optical transmission line. Therefore, owing to the relocation function of the HUB station 102, a transmission service of TEL-1 is effected between the CO station 101 and HUB station 102; a transmission service of TRM-2 is effected between the HUB station 102 and the RT station

103, and a transmission service of TRM-1 can be effected between the CO station 101 and the RT station 103.

A low order group interface signal of VT 1.5 payload signals is multiplexed in the SONET-LTE-1 to output in the direction of HUB station 102 as a synchronous optical signal OC-3. The SONET-ADM 23 receives an OC-3 (W) signal and after a signal that is dropped or terminated in the ADM among VT 1.5 payload signals included in the OC-3 (W) and a signal that is added or inserted in the ADM are combined so as to be relocated arbitrarily then formed again as a prescribed synchronous optical signal OC-3 (155.52 Mb/s) so as to be output in the direction of LTE-2 (22). The LTE-2 (22) device terminates the OC-3 signal, which is separated as a low order group interface signal. The SONET-ADM device 23 is provided with the LTE-1 (21) and the LTE-2 (22) back to back and possesses an additive function such that a relocation is effected in a payload envelope level that carries a low order group interface signal.

The SONET-ADM 23 carries out a pointer processing for the signal received from the direction of W as a prior step that forms a signal transmitting in the direction of E, thereby matching a frame position corresponding to a VT 1.5 payload having a new pointer value and a VT 1.5 payload to be added by this device, with a reference frame position that a transmitted signal possesses, thus a relocation of a VT 1.5 payload unit can be effected.

Figure 5:
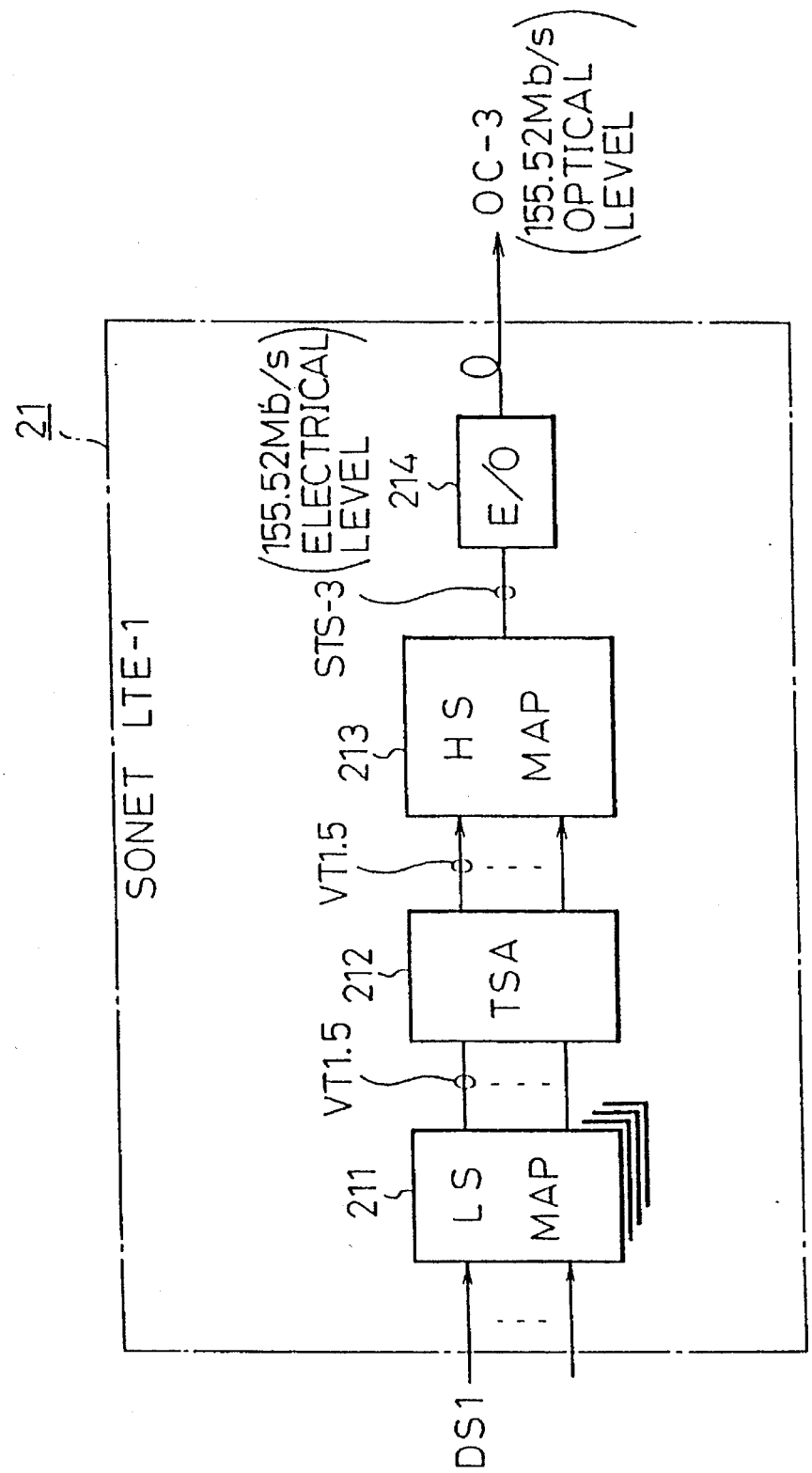
FIG. 5 is a schematic diagram showing a first synchronous optical signal termination unit LTE-1 in FIG. 4.

FIG. 5 is a schematic block diagram showing the structure of SONET-LTE-1 of the CO station in FIG. 4. In FIG. 5, an LS MAP portion 211 is devised to map DS-1 data of added data 1.544 Mb/s on a synchronized VT signal (specified by VT 1.5 in FIG. 5), contains an LS pointer generation function and can perform a low speed mapping.

A TSA portion 212 is a portion that locates a time slot of a VT signal output from the LS MAP portion 211 at an arbitrary position to obtain a time slot assignment. An HS' MAP portion 213 is a portion such that a VT signal group input from the LS MAP portion 211 is mapped on a STS-3 signal, has an HS pointer generation function and performs a high speed mapping. An E/O portion 214 is a portion that converts a STS-3 signal of an electrical level into an OC-3 signal of an optical level of 155.52 Mb/s. Since the SONET optical transmission device carries out a two-way communication, the constitution of the LTE-1 (21) is the same as that of the LTE-2 (22).

Figure 6:
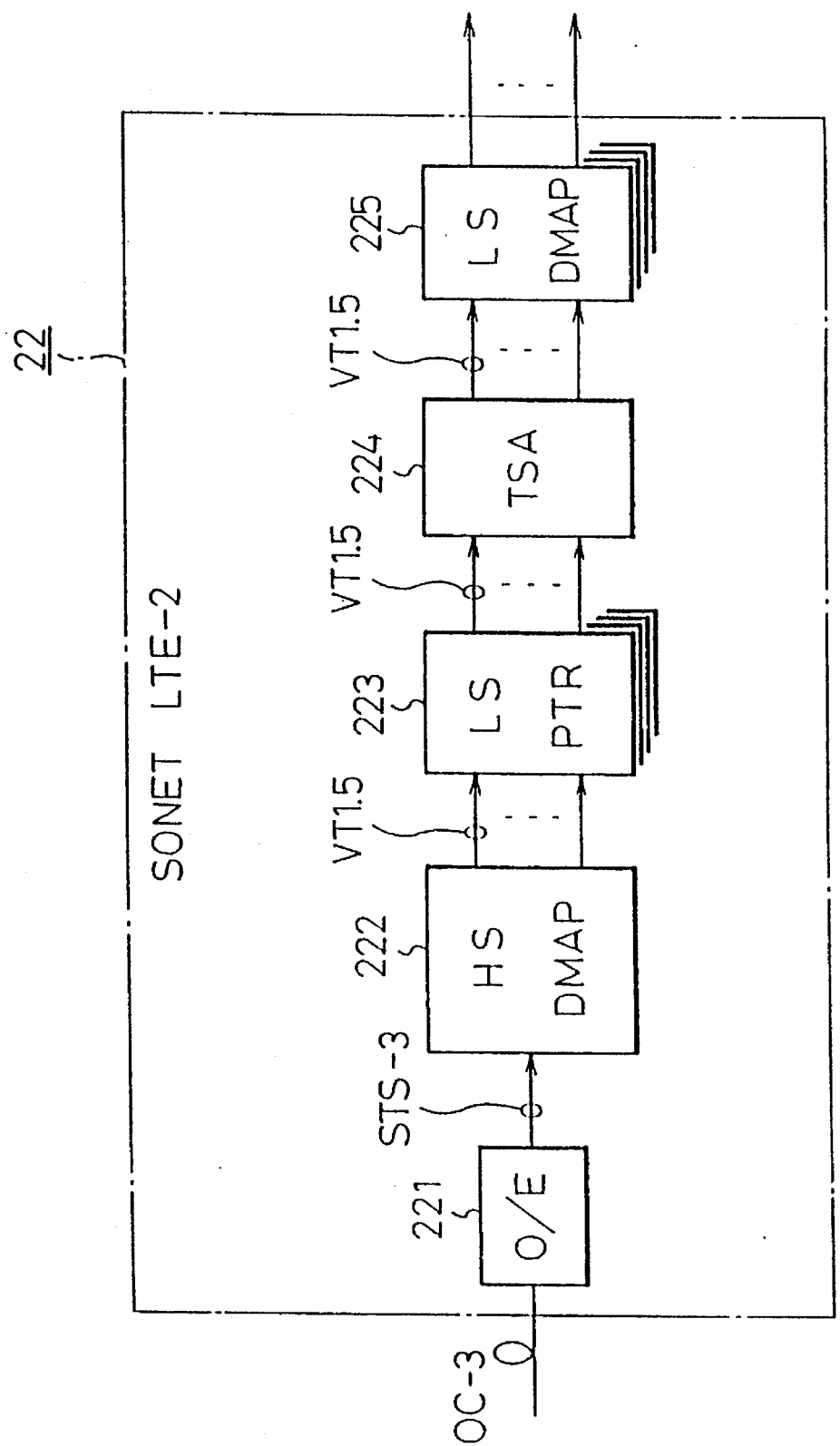
FIG. 6 is a schematic diagram Showing a second synchronous optical signal termination unit LTE-2 in FIG. 4.

FIG. 6 is a view showing the constitution of SONET-LTE-2 (22) of HUB station 102 in FIG. 4. In the figure an O/E portion 221 is a portion that converts an OC-3 signal of an optical level into a STS-3 signal of an electrical level. An HS DMAP portion 222 is a portion such that after a pointer processing is carried out at an HS level, separation into a VT signal is effected, so as to carry out a high speed demapping. An LS PTR portion 223 is a pointer processing portion for transferring a timing into an internal frame timing for facilitating an internal processing from a frame timing of the received STS-3 signal and its pointer processing is carried out at a VT signal level, such as the VT 1.5 signal. A TSA portion 224 is a portion that arranges a time slot of a VT signal group from the HS DMAP 222 at an arbitrary position to assign a time slot. An LS DMAP portion 225 is a portion that is used for a low speed demapping and a DS-1 signal of inserted data is dropped from the VT signal to be output and low speed LS level pointer processing can be performed simultaneously.

Figure 7:
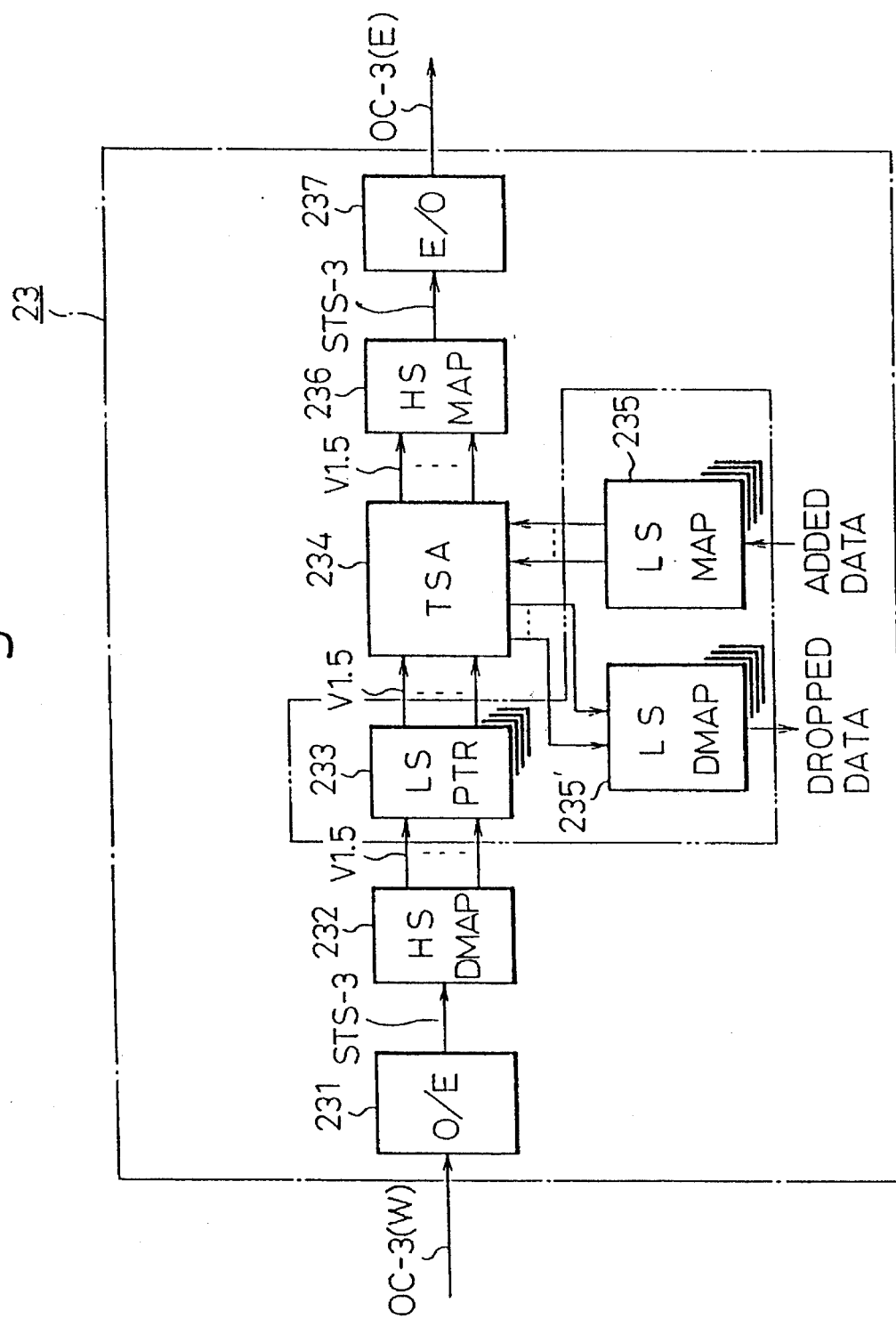
FIG. 7 is a schematic diagram showing a synchronous optical signal relocation unit ADM in a HUB station in FIG. 4.

FIG. 7 is a schematic diagram showing a SONETADM device 23 in a HUB station 102 in FIG. 4. In FIG. 7, reference numeral 231 denotes an opto-electrical conversion unit O/E, 232 denotes a separation unit (high speed demapping portion) HS DMAP, 233 denotes a pointer processing unit (low speed pointer portion) LS PTR, 234 denotes an relocation unit TSA, 235 denotes an inserted data allocation unit LS MAP, 235' denotes a data dropping unit LS DMAP, 236 a multiplexer unit HS MAP, and 237 denotes an electro-optical conversion unit E/O.

A synchronous optical signal OC-3 transmitted from the W-direction of an optical level is converted into an electrical signal at the opto-electrical conversion unit O/E (31), synchronization is detected and the converted electrical signal is recognizable as a signal forming a frame of the signal STS-3 of electrical level. The STS-3 signal is formed by going through a prescribed multiple conversion procedure. The high speed demapping unit HS DMAP 232 separates the STS-3 signal into the VT 1.5 payload signal. The pointer processing unit 233 processes the payload pointer to the separated VT 1.5 payload signal and the relocation unit 234 rearranges the VT 1.5 payload signal in response to data allocation of LS MAP-235. The HS MAP unit 236 multiplexes the relocated VT 1.5 payload signal and reforms the STS-3 signal again, and the E/O 237 converts the STS-3 signal into the synchronous optical signal OC-3 to output thereof.

Figure 8:
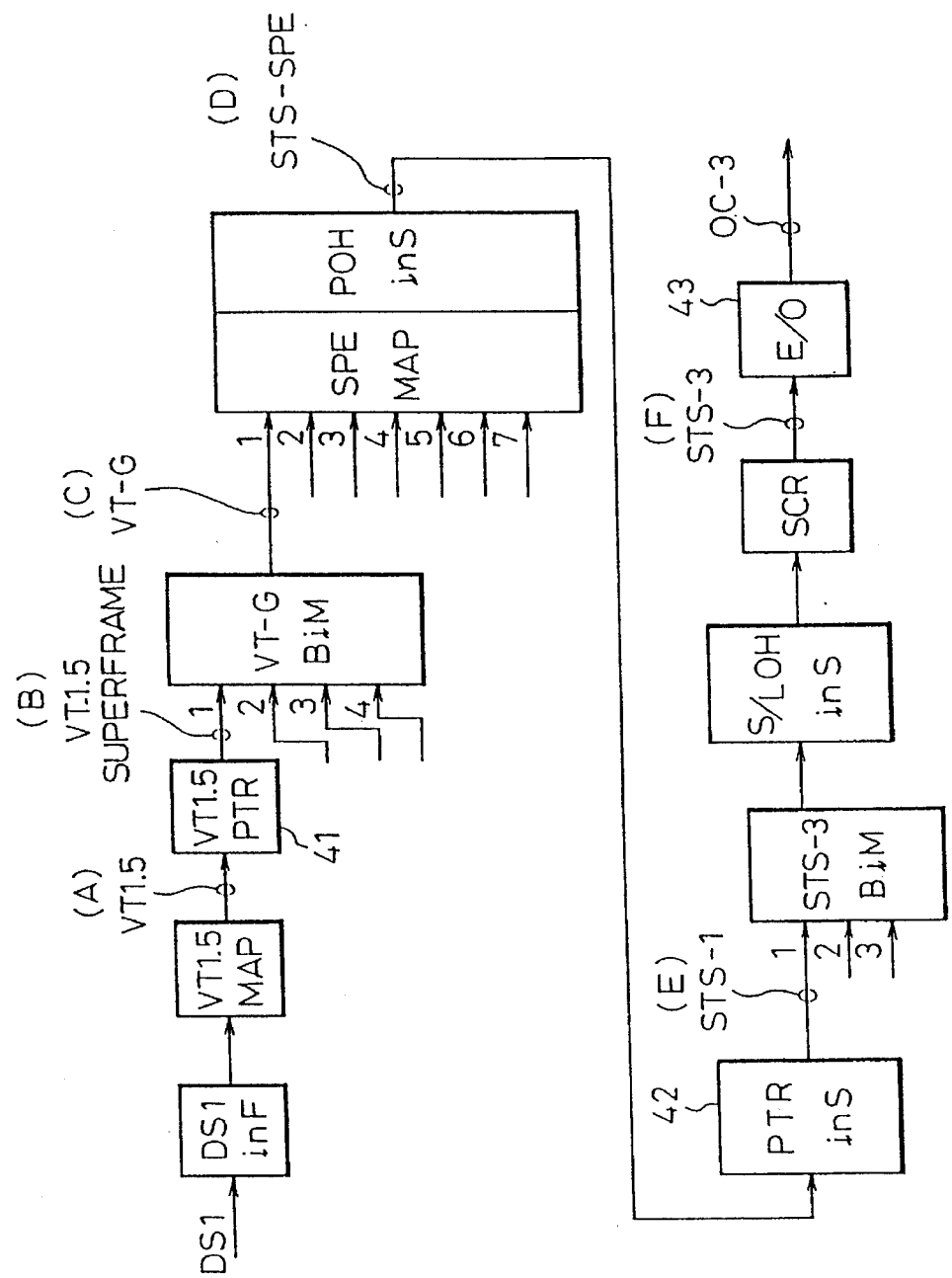
FIG. 8 is a functional block diagram showing a multiple conversion procedure in a SONET optical transmission system.

FIG. 8 is a functional block diagram showing the SONET multiple conversion procedure in a multiplexer 233, 235, 235' of the ADM in FIG. 7.

DS1 inF is a step of interfacing a DS1 signal; VT 1.5 MAP is a step of mapping an interfaced DS1 signal on a VT 1.5 signal; VT 1.5 PTR 41 is a step such that a pointer byte is added to a VT 1.5 signal to form a VT 1.5 superframe and it is possible to treat a VT 1.5 signal as a synchrous signal. VT-G BiM is a step such that four VT 1.5 superframes are byte-interleaved multiplexed, thereby forming a serial VT-G signal (intermediate frame). SPE MAP/POH ins is a step such that seven VT-G signals are mapped on STS-SPE signals and a surplus byte necessary for STS-SPE signals or STS-POH are inserted here. PTR ins is a step such that a pointer byte or the like is added to the STS-SPE signal to form a STS-1 signal. STS-3 BiM is a step such that three STS-1 signals are byte-interleaved and multiplexed to create a fundamental structure of the STS-3 signal. S/L OH ins is a step such that SOH and LOH are inserted. SCR is a step such that a prescribed scramble is effected to the STS-3 signal. And E/O is a step such that the STS-3 signal of an electrical level is converted into the OC-3 signal of an optical level.

Figure 9:
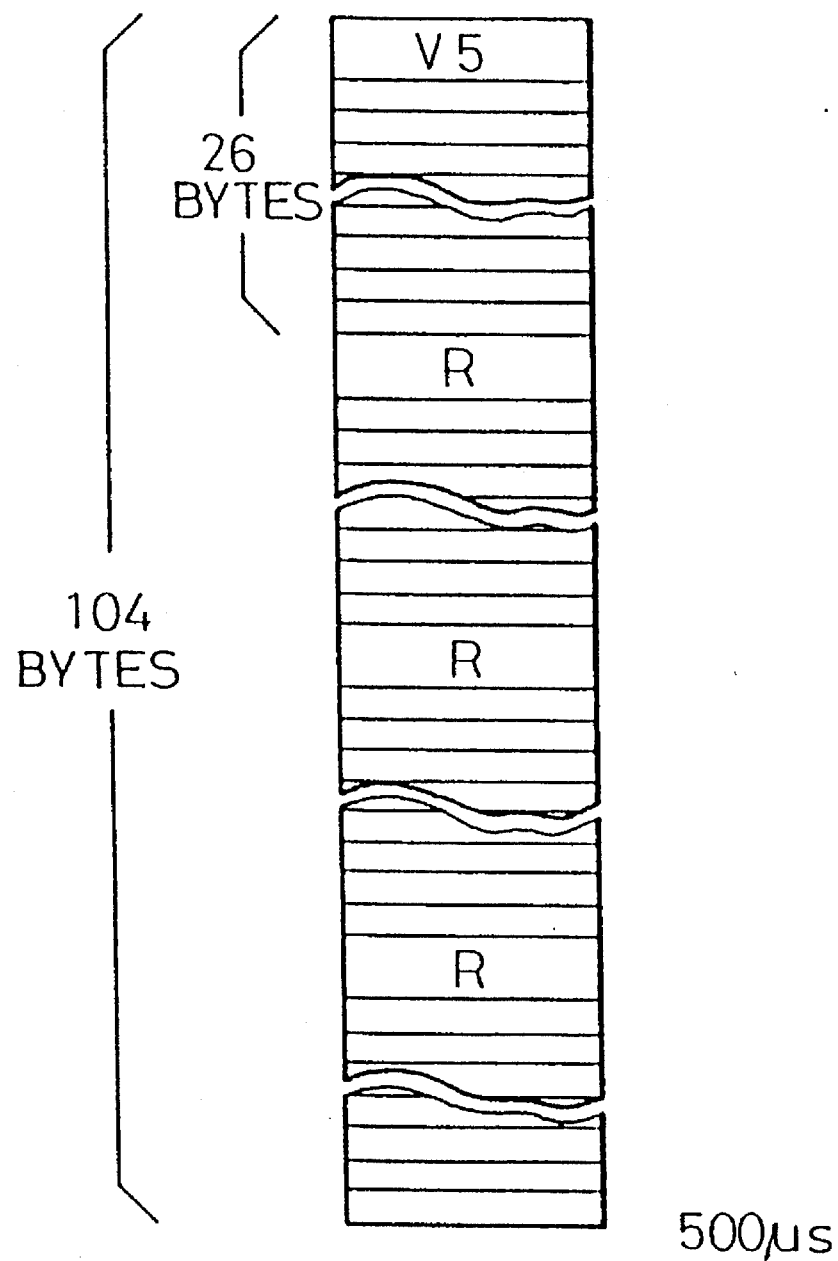
FIG. 9 is a view showing a frame of a VT 1.5 payload envelope (VT 1.5 signal), such as (A) in FIG. 8.

FIG. 9 is a view showing the frame structure of the VT 1.5 signal that corresponds to (A) portion in FIG. 8. V5 is a head byte formed by 26 bytes and R is a surplus byte formed by 26 bytes. The whole VT 1.5 signal (VT 1.5 payload envelope) is formed by 104 bytes and amounts to 500 µs of timing.

Figure 10:
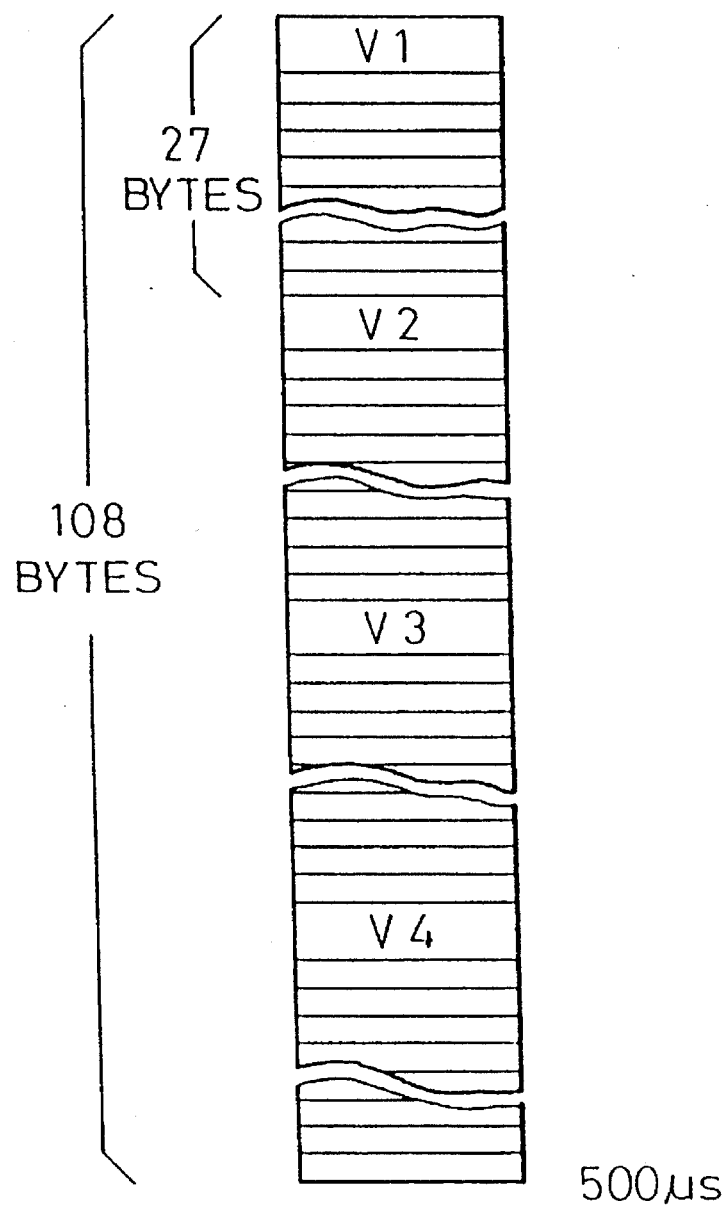
FIG. 10 is a view showing a VT 1.5 superframe such as (B) in FIG. 8.

FIG. 10 is a view showing the structure of the VT 1.5 superframe that corresponds to (B) portion in FIG. 8. FIG. 10 illustrates a superframe of a VT 1.5 signal such that surplus bytes V1 to V4 each formed by 27 bytes are periodically inserted as a pointer byte. Where the VT 1.5 superframe is positioned is not defined, but can be inserted everywhere. A Specified No. is used to show where the head byte exists, and the head byte is defined by $V_1$ and $V_2$ as a pointer value using $V_1$, $V_2$ and the superframe.

Figure 11:
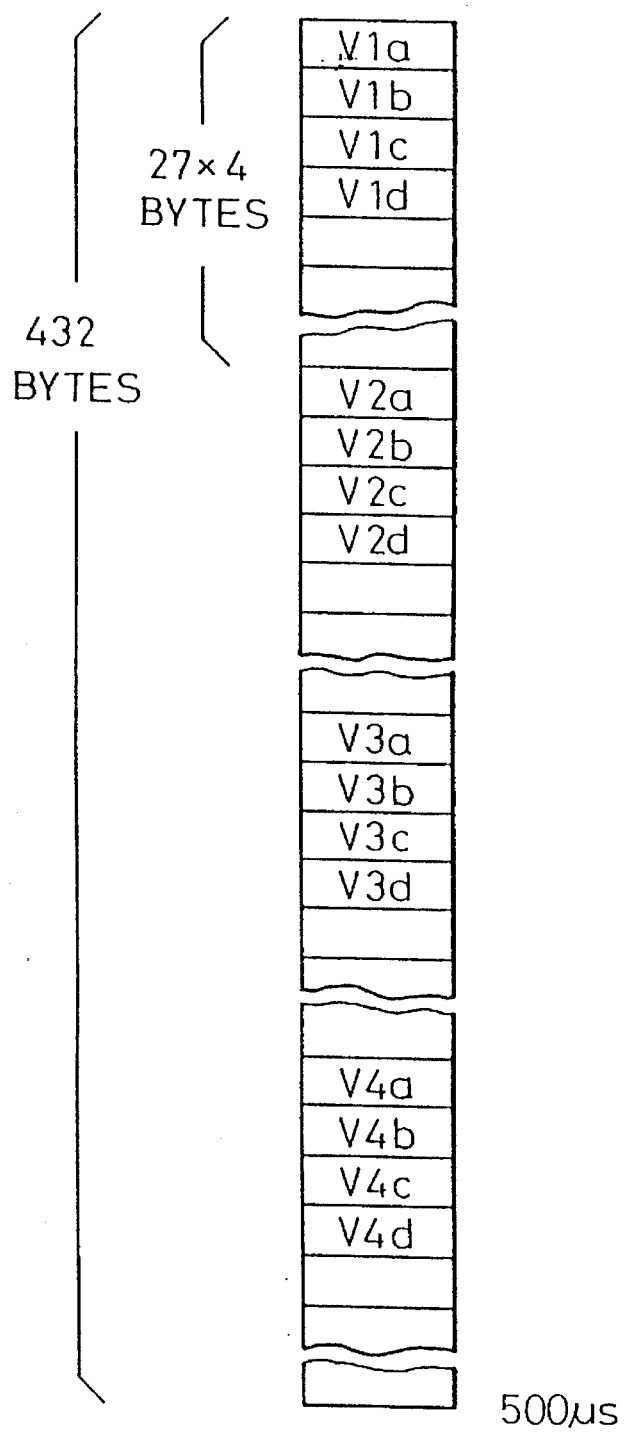
FIG. 11 is a view showing a VT-G signal in a serial byte-interleaved state, such as (C) in FIG. 8.

FIG. 11 is a view showing a VT-G signal in a serial byte-interleaved state such as (C) in FIG. 8, which is formed by 27×4×4=432 bytes in the case when the VT 1.5 signal is four-fold multiplexed.

Figure 12:
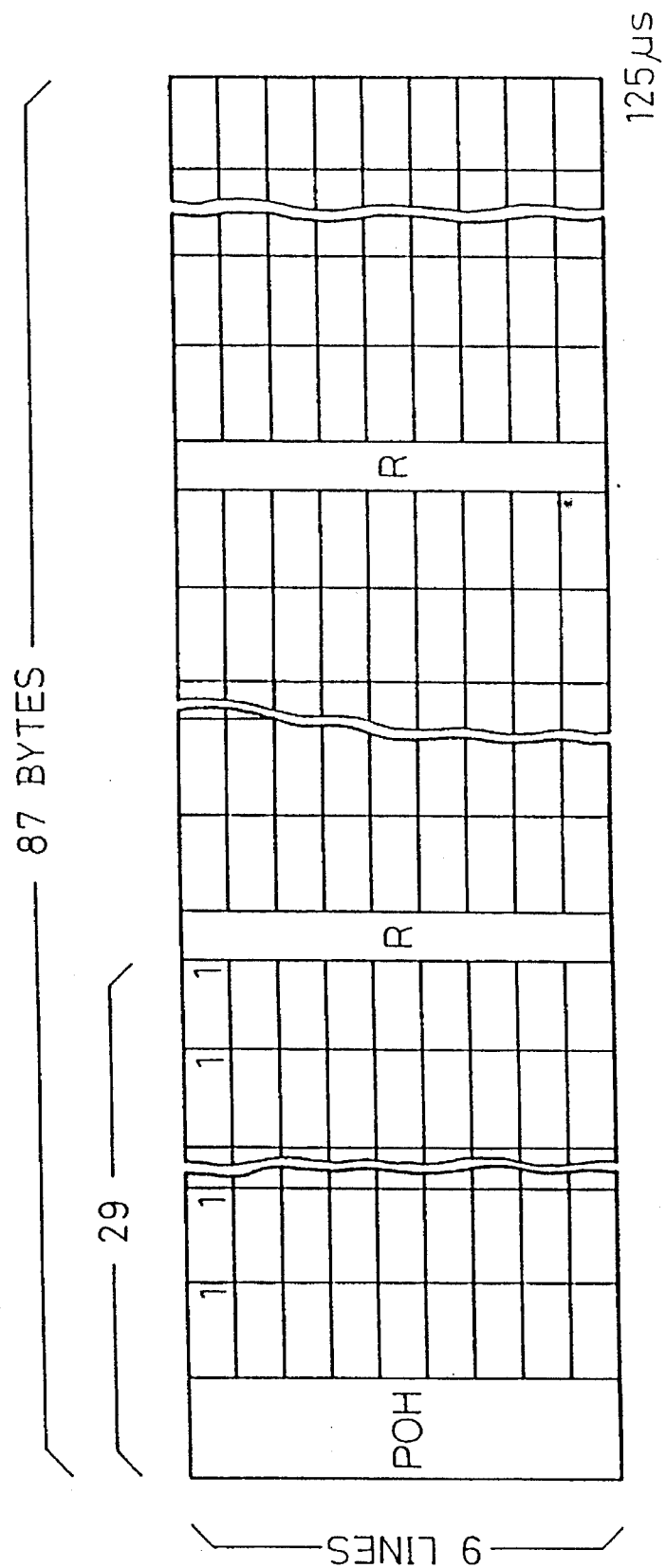
FIG. 12 is a view showing a frame structure of a STS-SPE signal such as (D) in FIG. 8.

FIG. 12 is a view showing the frame structure of a STS-SPE signal such as (D) in FIG. 8, which is formed by nine lines of 87 bytes, has a capacity for admitting seven lines of VT-G signals, is formed by mapping the VT-G signal in order according to a definition, and the surplus bytes such as POH, R and R are inserted therein.

FIGS. 13(A) and 13(B) are views showing an operation of a STS-1 signal by FIG. 13(A) and a frame structure of a STS-1 signal such as (E) in FIG. 8. In FIG. 13(A), 3 bytes are added to 87 bytes in FIG. 12 to amount to 90 bytes and a frame structure of STS-1 signal is formed by nine lines of 90 bytes. In FIG. 13(A), the STS-1 signal takes 125 µs to proceed from a first line to a ninth line and each line is formed by 90 bytes including a surplus byte of 3 bytes. FIG. 13(B) denotes a frame structure of the STS-1 signal to which surplus bytes SOH and LOH are added. When the frame is transmitted serially on a transmission line, as shown in FIG. 13(A), a share of 90 bytes is sent in the 1 Direction, thereafter the signal starts a new line in the 2 direction, and then a share of 90 bytes is transmitted in the 1 direction. As a whole, a share of nine lines of 90 bytes, viz., 810 bytes is transmitted for 125 µs to be 51.84 Mb/s.

Figure 14:
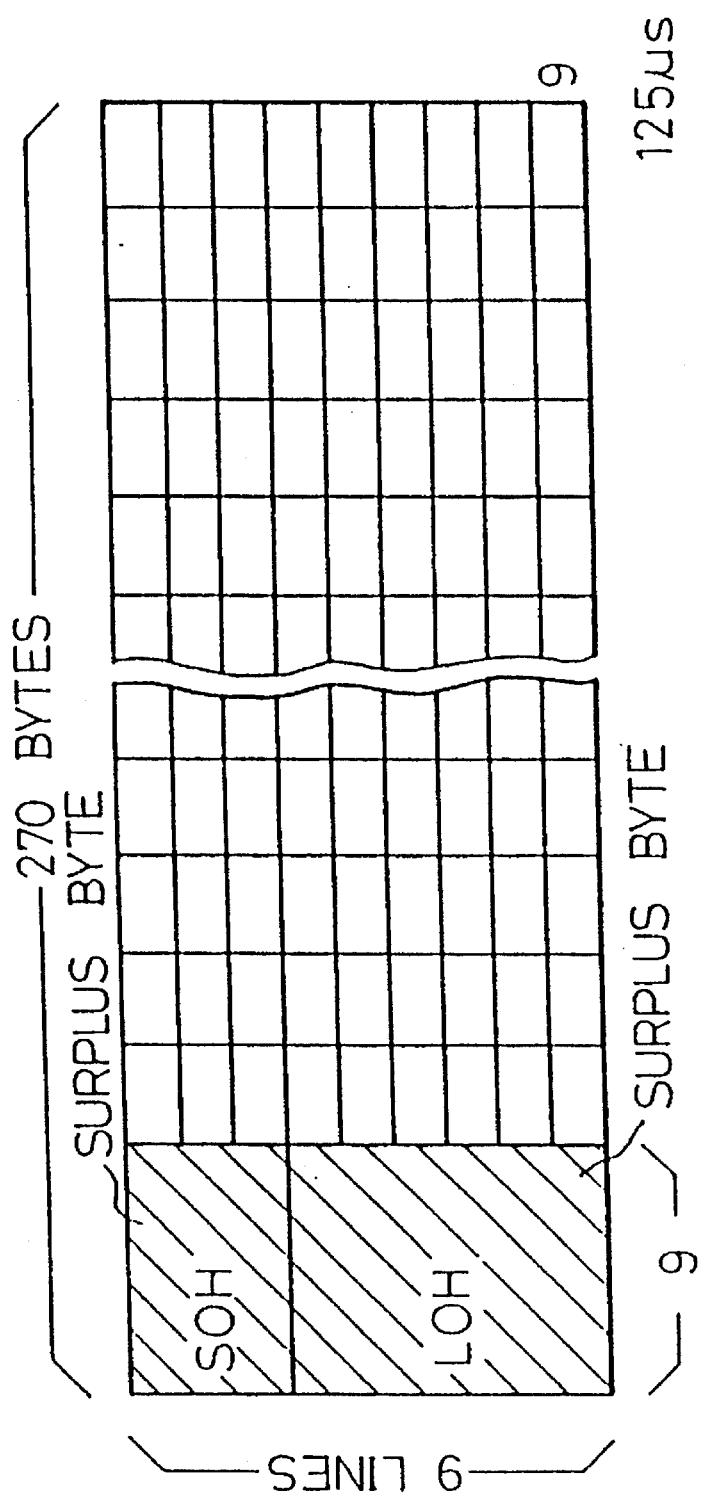
FIG. 14 is a view showing a frame structure of a STS-3 signal, such as (F) in FIG. 8.

FIG. 14 is a view showing a frame structure of a STS-3 signal such as (F) in FIG. 8. Three STS-1 signals in FIGS. 13(A) and 13(B) are byte-interleavedly multiplexed and the 1 direction in FIG. 13(B) is formed by 270 bytes. As is the same as in FIG. 13(B), a share of surplus bytes in SOH and LOH is present and all frame is transmitted for 125 µs. As a whole, as for the STS-3 signal, 270×9=2430 bytes are transmitted for 150 µs and the transmission rate is 155.52 Mb/s.

Figure 15:
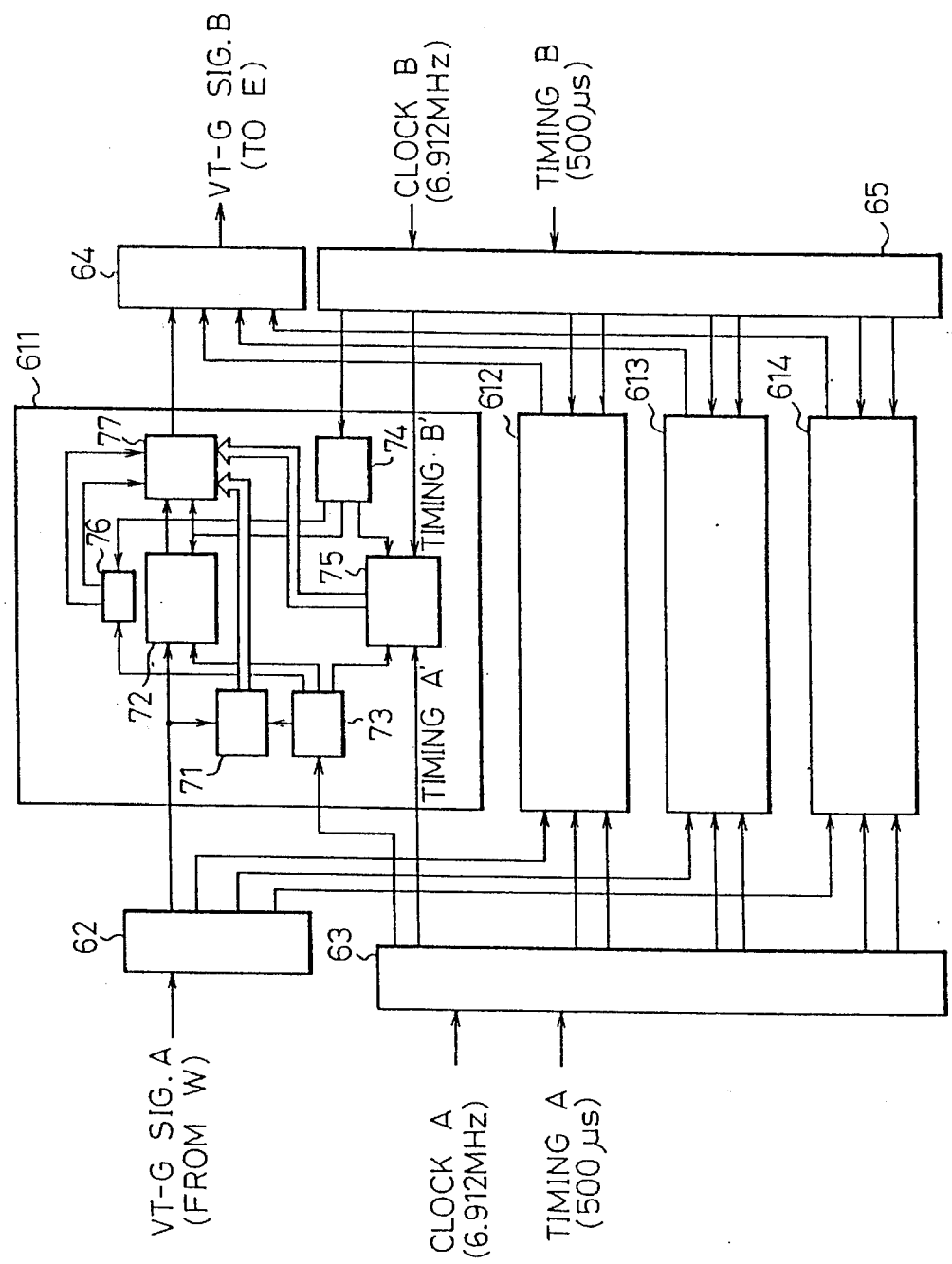
FIG. 15 is a schematic block diagram showing an embodiment of a pointer processing circuit in accordance with the present invention.

FIG. 15 is a schematic block diagram showing an embodiment of a pointer processing circuit in accordance with the present invention.

Reference numeral 611–614 denotes a pointer operation addition unit, 62 a VT-G separation unit for separating a VT-G signal, 63 a separation pulse generator unit for inputting a clock A (6.912 MHz) for separating a VT-G signal and a timing signal A (500 µs) to generate a separation signal, 64 a VT-G multiplexer unit for multiplexing a VT-G signal, and 65 a multiplexing pulse generator unit for generating a timing signal for multiplexing a VT-G signal.

In each pointer operation addition unit 611–614, reference numeral 71 denotes a pointer detection unit for detecting a payload pointer, 72 a storage unit, 73 a write timing pulse generator unit for the storage unit, 74 a read timing pulse generator unit, 75 a phase difference counter for counting the phase difference between a write side frame and a read side frame, 76 a phase comparator unit for detecting the phase difference between a write address and a read address, and 77 pointer insertion unit for inserting a pointer value.

Figure 16A:
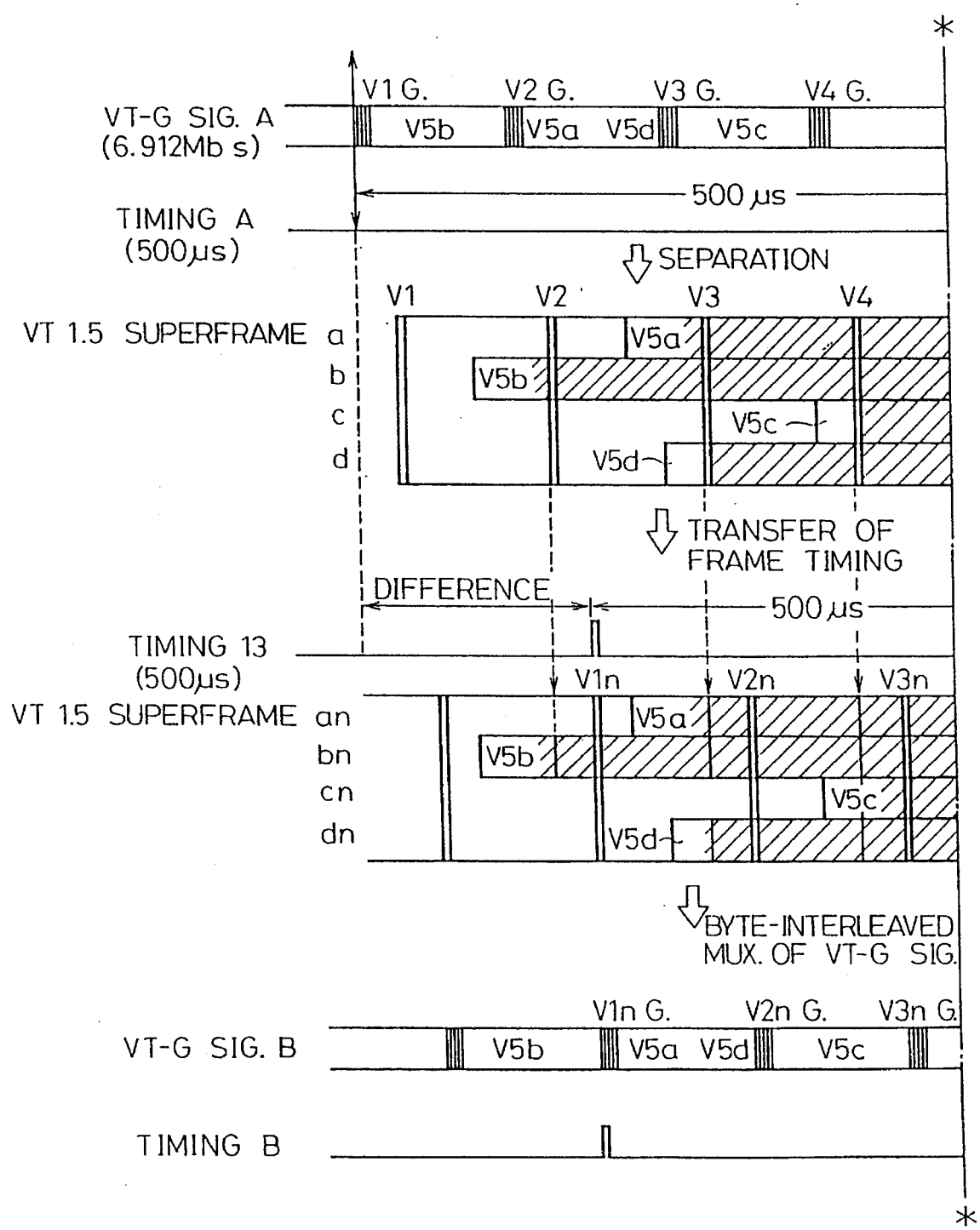
FIGS. 16(A) and 16(B) form a timing chart showing the operation of the circuit in FIG. 15.
Figure 16B:
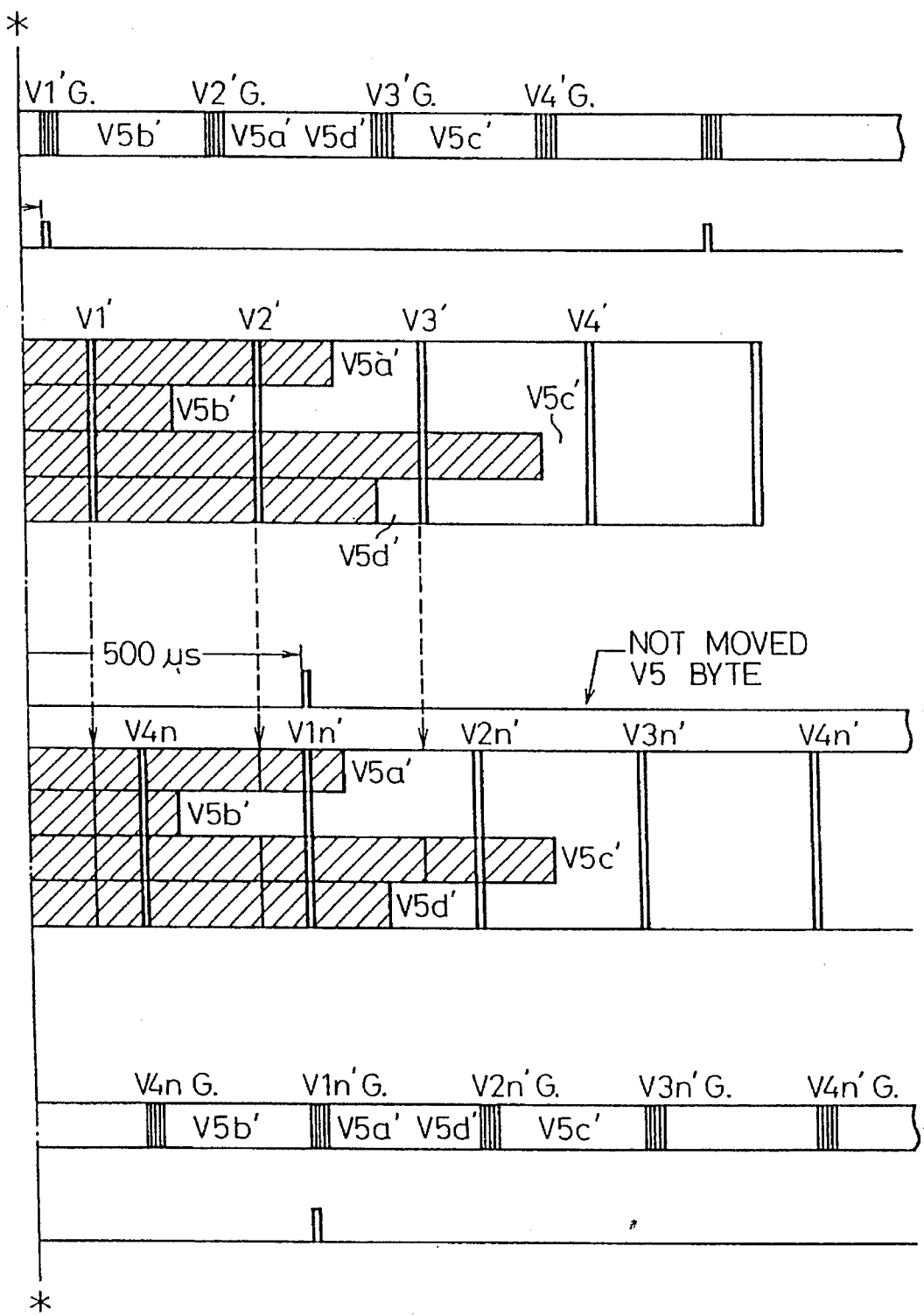

The VT-G separation unit 62 separates a VT-G signal A (6.912 Mb/s) from the W direction (Waste direction) into four VT 1.5 superframe (a, b, c, d) signals to deliver them to each pointer operation addition unit 611–614. FIGS. 16(A) and 16(B) are timing charts showing the operation of the circuit in FIG. 15. As shown in FIGS. 16(A) and 16(B), the above-described VT-G signal A is formed by V1 Group—V4 Group, V1' Group—V4' Group, —and the positions of a not moving V5 byte (V5a, V5b, V5c, V5d), (V5a', V5b', V5c', V5d'), —are built in the VT 1.5 superframe (a–d) by the above separation action. The VT 1.5 superframe generates a timing signal B (500 µs) and carries out a pointer processing each VT 1.5 unit based on the difference of a timing A and a timing B to transfer a frame timing.

A VT 1.5 superframe (an, bn, cn, dn) is formed by (V1n, V2n, V3n, V4n), (V1n', V2n', V3n', V4n'), —and (V5a, V5b, V5c, V5d), (V5a', V5b', V5d'), —. Further, by byte-interleavedly multiplexing for the VT-G signal, a VT-G signal B (6.912 Mb/s) and a timing signal B are obtained. In this case, the VT-G signal B is formed by (V1n Group, V2n Group, V3n Group, V4n Group), (V1n' Group, V2n' Group, V3n' Group, V4n' Group), —and (V5a, V5b, V5c, V5d), (V5a', V5b', V5c', V5d'), —. Therefore, the VT-G signal A is four-fold separated into the VT 1.5 superframe and carries out a pointer processing separately at a level of each VT 1.5 superframe. The write/read operation to the storage unit is carried out by a level of the VT 1.5 signal.

The operation of each constitution in FIG. 15 will be described as follows. When the separation pulse generator unit 63 receives a clock A of 6.912 MHz with regard to the VT-G signal A and a timing signal A of a frame length equal to 500 µs, a timing signal A' to each VT 1.5 superframe at the separation time is generated to supply it to each pointer operation addition unit 611 to 614.

In the pointer operation addition unit 611 one of the separated VT 1.5 signals is written in a storage unit 72 in order. The data written in the storage unit 72 is VT 1.5 payload data (VT signal) except for a surplus bit in the VT 1.5 superframe.

A write timing pulse generator unit 73 delivers a write clock to the VT 1.5 payload data except for the surplus bits in response to a timing signal provided by the separation pulse generator unit 63.

On the other hand, a pointer detection unit 71 monitors a pointer byte in the separated VT 1.5 superframe to recognize a pointer value. The VT 1.5 payload data written in the storage unit 72 is read in response to a read clock output from the read timing pulse generator unit 74 and then a new pointer value is computed in a pointer addition unit 77 to add a new surplus bit (V1 to V4) thereinto and the VT 1.5 superframe is formed. Then, a phase difference counter 75 counts the phase difference between a timing pulse A indicating a frame position of a VT-G signal A and a timing pulse B' indicating the reference frame position by a byte unit and the pointer addition unit 77 adds a byte unit value indicating the phase difference counted by the phase difference counter 75 to the pointer value (by byte unit) recognized at the pointer detection unit 71 and in response to the phase difference between a write clock output from the write timing pulse generator unit 73 and a read clock output from the read timing pulse generator unit 74 ill a phase comparation unit 76, the result of the addition is increased or decreased to obtain a new pointer value and then it is inserted into a read VT 1.5 signal to form a VT 1.5 superframe.

The operation of other pointer operation addition units 612–614 are the same as in the unit 611.

The VT 1.5 superframe output from each pointer operation addition unit 611 to 614 is multiplexed at a VT-G multiplexer unit 64. At this time, a multiplexed pulse generator unit 65 receives a clock B of 6.912 MHz with regard to a VT-G signal B at the E side and a timing pulse B of 500 µs showing a frame length to generate a timing signal at a time of multiplexing and deliver it to each pointer operation addition unit 611 to 614. Therefore, the timing signal at a time of multiplexing can be treated as a VT-G signal that a transfer to an internal frame timing has been completed.

Figure 17:
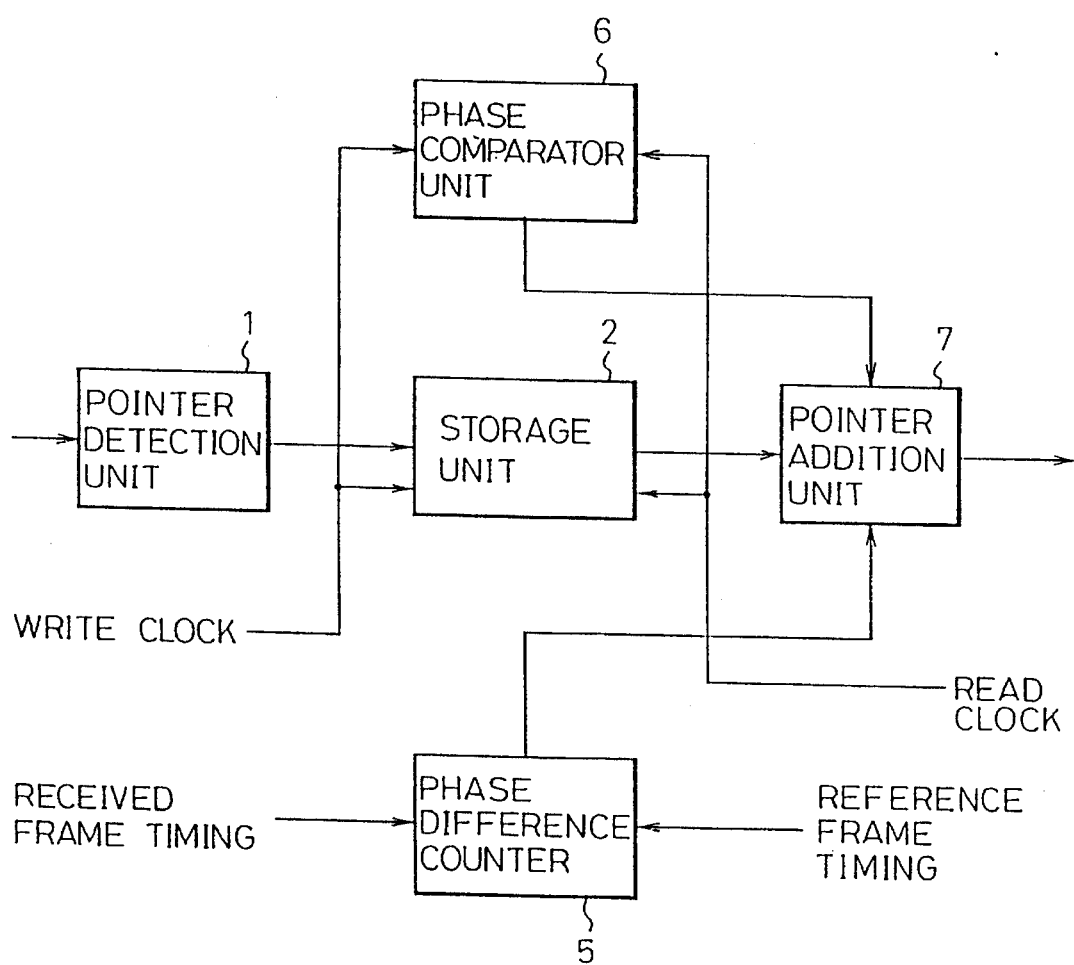
FIG. 17 is a schematic block diagram explaining the function of another embodiment of a pointer processing circuit of the present invention.

FIG. 17 is a view showing the function of a pointer processing circuit of another embodiment of the present invention. In synchronous optical transmission equipment in an optical digital data transmission network that communicates therewith by transmitting information by regarding a synchronous payload envelope as a transmission unit via a synchronized network, a pointer detection unit 1 is provided in which a surplus byte in each synchronous payload envelope in a state of multiplexing a plurality of synchronous payload envelopes is dropped and a head position of each synchronous payload envelope is recognized from a pointer value included in said surplus byte. Then, each synchronous payload envelope is written in a storage unit 2 in response to a write clock and read in response to a read clock. A phase difference counter 5 is provided in which a phase difference between a frame timing of the received signal and a reference frame timing is counted. On the other hand, in a pointer addition unit 7, in response to the result such that a head position of the synchronous payload envelope of a received signal that has been recognized at the pointer detection unit 1 and the phase difference counted at the phase difference counter 5 are added, and then a new surplus byte having a pointer value that becomes the same phase as the reference frame with regard to a plurality of synchronous payload envelopes read from the storage unit 2 and in an intact multiplexed state is added thereto to, form a new synchronous payload envelope.

Therefore, it is concluded that since the pointer processing of the present invention is not effected by each payload unit, but a plurality of payloads are lumped together to execute the pointer processing of each appropriate group unit, the storage unit 2 can be shared therewith to avoid the influence of frequency fluctuation such as a wander or a Jitter. Further, since a separation unit is not necessary, it is advantageous that it is possible to simplify the structure of a multiconversion unit, thus reducing the scale of the circuitry in the pointer processing device.

Figure 18:
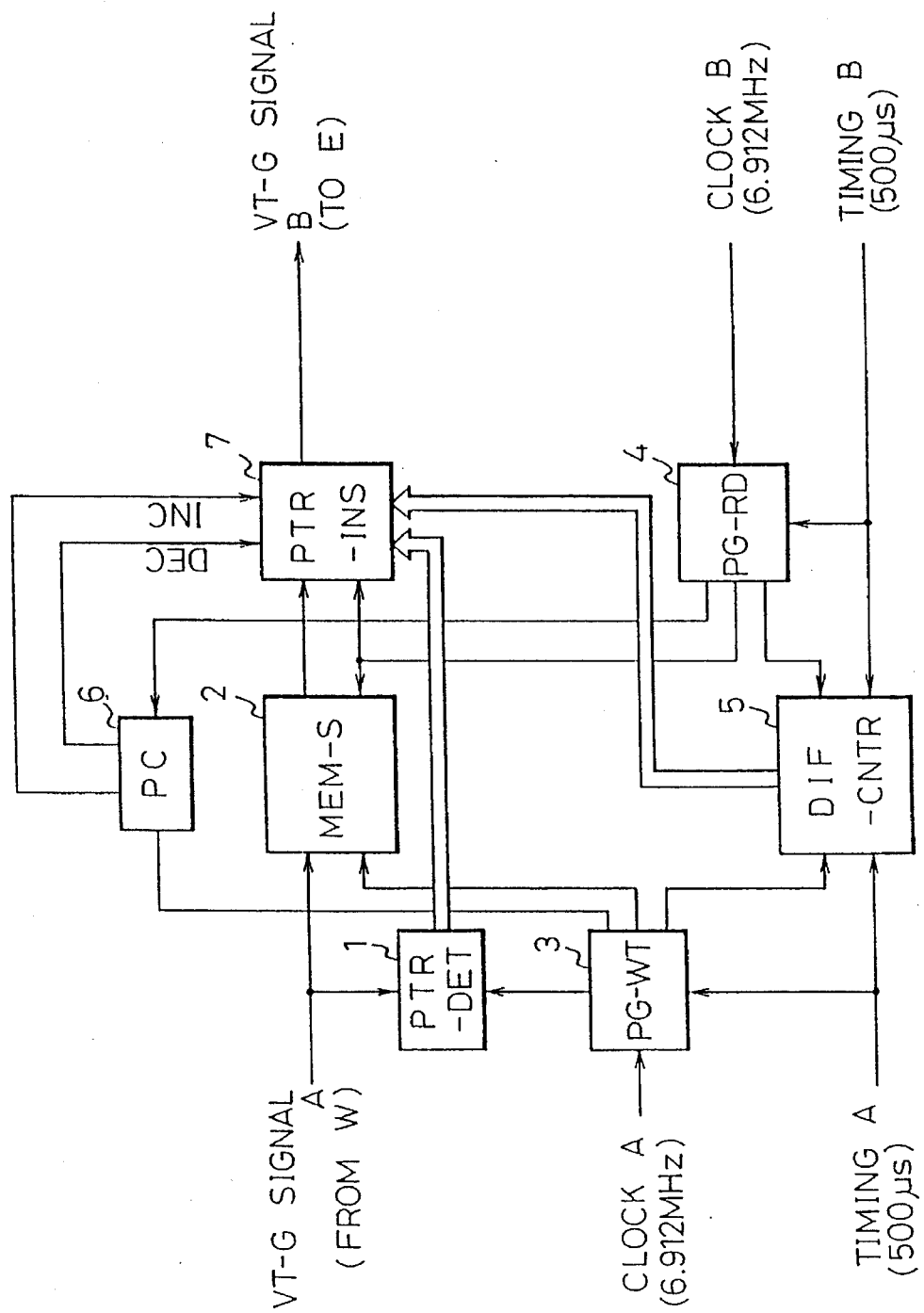
FIG. 18 is a block diagram showing the constitution of another embodiment of a pointer processing circuit in accordance with the present invention.

FIG. 18 is a block diagram showing the constitution of another embodiment of a pointer processing circuit in accordance with the present invention.

In FIG. 18, reference numeral 1 denotes a pointer detection unit PTR-DET for monitoring a pointer byte in a VT-G signal to recognize a pointer value. 2 denotes a storage unit MEM-S where a VT payload data or a VT signal in which surplus bits in four VT 1.5 superframes forming a VT-G signal are excluded, is written or read. 3 denotes a write timing pulse generation unit PG-WT that generates a write clock of four VT 1.5 payload data to the storage unit 2 (MEM-S). 4 denotes a read timing pulse generation unit PG-RD that generates a read clock of four VT 1.5 payload data written in the storage unit 2 (MEM-S). 5 denotes a phase difference counter (DIF-CNTR) that counts the phase difference between a frame in the write side and in the read side. 6 denotes a phase comparator unit PC that detects the phase difference between a write address and a read address and 7 denotes a pointer addition unit PTR-INS that adds or inserts a pointer value.

In FIG. 18, when the relocation of a VT 1.5 level is effected, a separation is not applied up to the VT 1.5 payload (VT 1.5 signal) but the pointer processing is executed in the lump at a VT-G level such that a VT 1.5 signal is multiplexed four times.

As described in FIG. 11, a reverse conversion in the multiple conversion procedure for a STS-3 signal received from the W-direction is effected in order and a signal separated up to the VT-G level is input from the left in the figure, as shown by a VT-G signal A.

At this time, a VT-G level signal exists in a four-signal bundle of VT 1.5 signals and the head position of the payload of VT 1.5 signal is devised to coincide therewith so as to be able to effect a multiple conversion processing at a later step (Refer to FIG. 13). Therefore, the timely position (a time slot) of each VT 1.5 signal included in the the VT-G level signals is fixed and it is easily appreciated that a pointer byte as a surplus byte indicating a payload pointer value that occurs periodically in the VT 1.5 signal is dropped by a VT-G level signal to recognize thereof.

First, in the pointer detection unit 1, the VT-G level signal A is not separated and the pointer byte is monitored intact so as to recognize the pointer value.

According to a timing signal derived from a clock A in the write timing pulse generator unit 3, a write operation in the storage unit 2 is carried out sequentially. The write data into the storage unit 2 is only VT 1.5 payload data ×4, except for a surplus bit in the VT 1.5 signal, and the write timing pulse generator unit 3 produces a write clock in response to the data, except for the surplus bit.

The read operation of the VT 1.5 payload data ×4 written into the storage unit 2 is effected by a timing signal produced from a clock B in the read timing pulse generator unit 4 (PG-RD). The PG-RD generator unit 4 produces a read clock so as to provide a read timing that is synchronized with a clock B and is liable to be formed in the reference frame in view of the position of a surplus bit.

Therefore, a transfer from the VT-G data A to clock B can be effected by the storage unit 2 and the processing thereafter for the data read out from the storage unit 2 also can be effected by the clock B.

A timing pulse A indicating the frame position of the VT-G signal A is input to the phase difference counter 5 and is compared with the position of a timing pulse B indicating the reference frame position so as to count the phase difference with the reference frame position by means of a byte unit.

The pointer addition unit 7 adds the value indicating the phase difference of a byte unit counted in the phase difference counter 5 to a pointer value of a byte unit monitored at the pointer detection unit 1, thereby counting a new pointer value of a byte unit to insert it as a data surplus byte into payload data read from the storage unit 2.

In this case, since the payload point makes it possible to regulate the frequency of a VT 1.5 unit, each pointer value is not fixed, but changes dynamically. Therefore, it is necessary to process the pointer value dynamically according to a rule of the VT 1.5 unit and to deliver the change of the pointer value of the VT 1.5 unit from the W-direction to the E-direction.

The pointer addition unit 7 independently detects a change of the pointer value ×4 of the VT 1.5 signal within the VT-G data by a VT 1.5 unit and a calculation is effected such that the pointer value in view of the change is made a new pointer value.

In this case, based on the frequency difference between a clock A produced from the received signal and a clock B of a signal to be transmitted, the phase is compared at the phase comparator unit 6 and then the VT 1.5 signal ×4 is lumped together; the pointer values are changed and updated by a VT-G unit so as to absorb the frequency difference. In the case of a synchronized network, the phase difference is controlled up to the extent of the minimum.

Figure 19A:
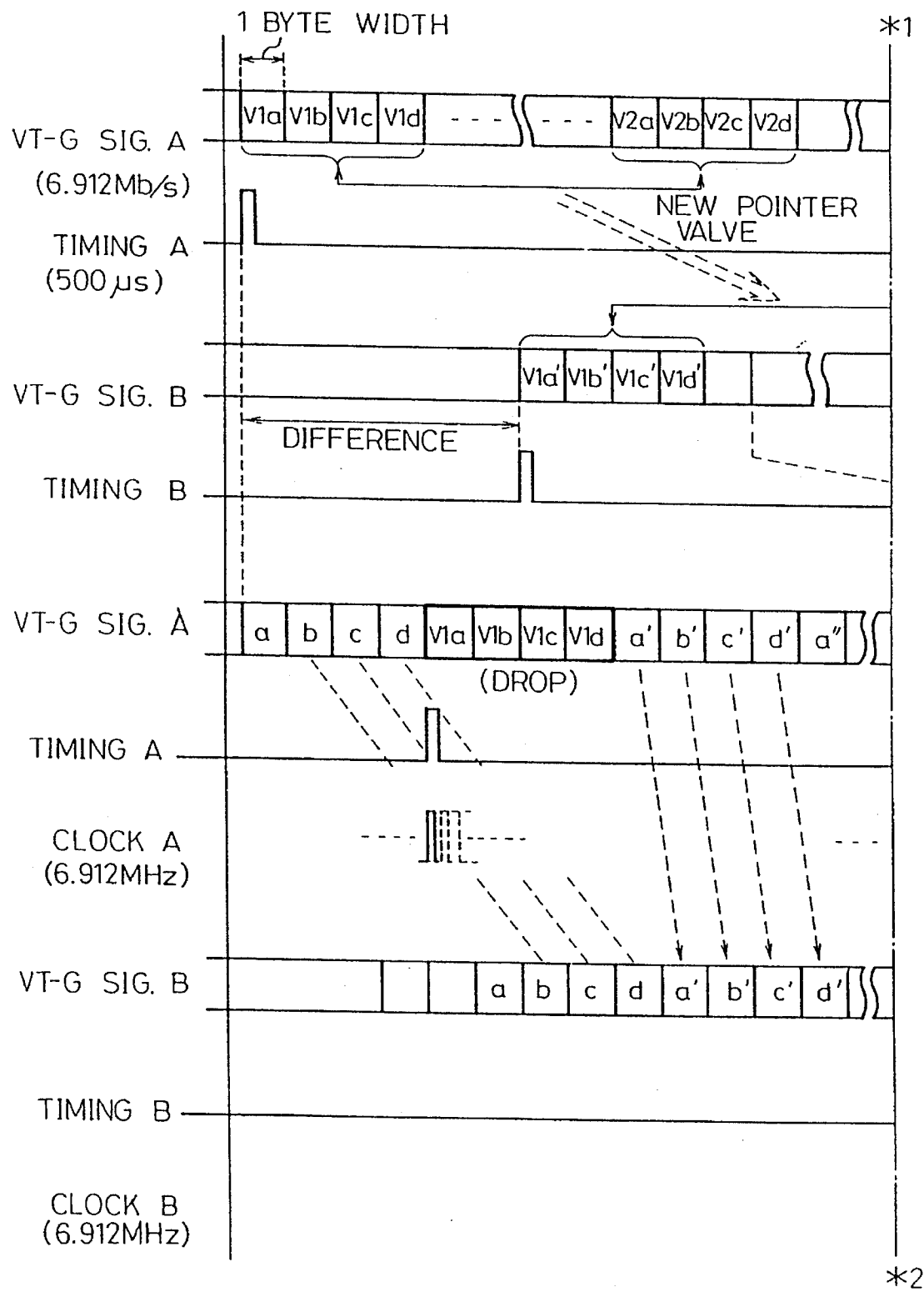
FIGS. 19(A) and 19(B) form a timing chart showing the operation of a pointer processing circuit in FIG. 18.
Figure 19B:
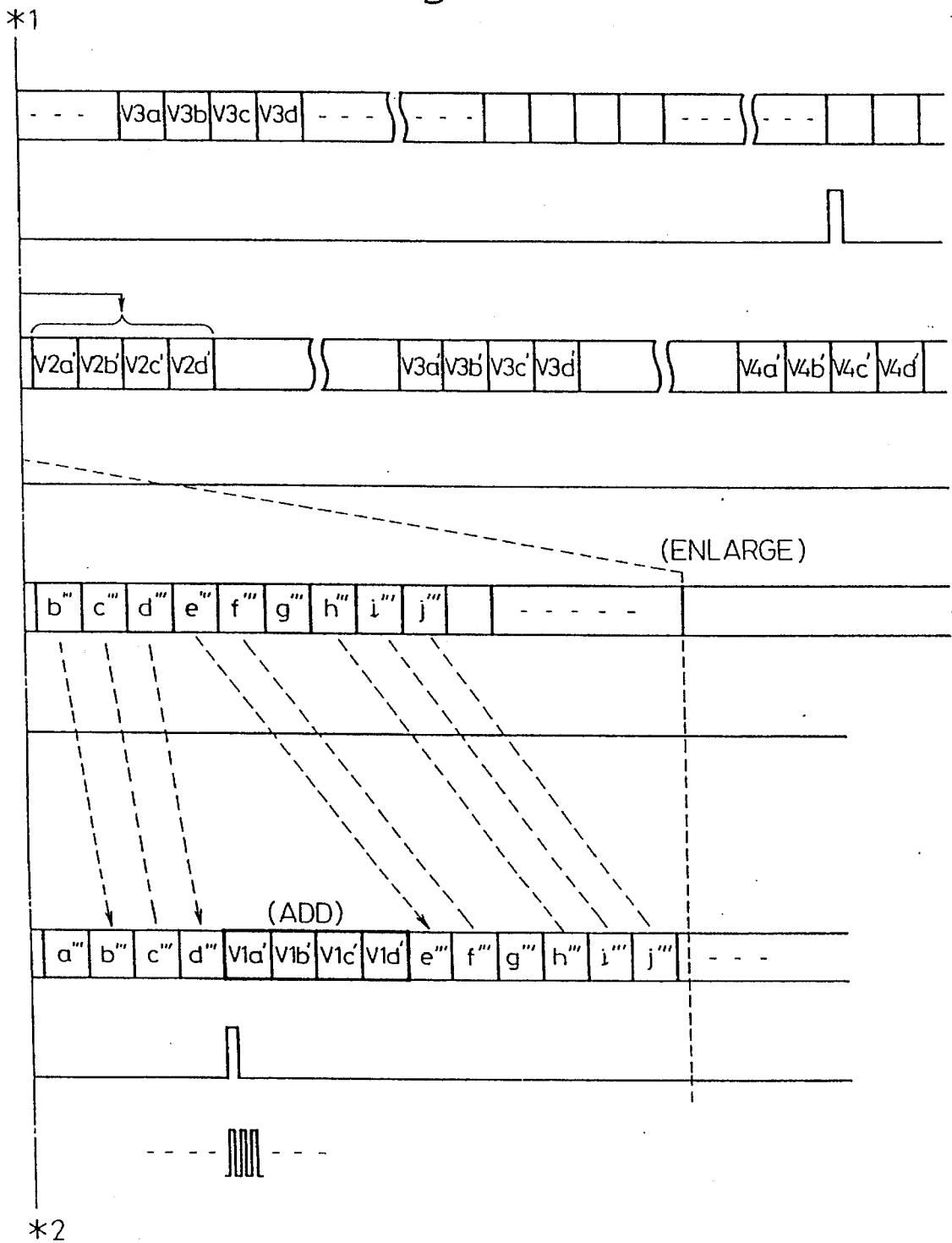

FIGS. 19(A) and 19(B) form a time chart showing the operation of another embodiment of the pointer processing system of the invention in FIG. 18.

By a timing pulse A and a clock A obtained from a VT-G signal A prior to processing, V1 to V4 bytes are extracted in a state of keeping on bundling in four and each pointer value (V1a—V4d) is obtained. Four bundled state of VT 1.5 signal (abcd, a'b'c'c', a"b"c"d", a'"...) except for surplus bytes (V1a–V4d) from the VTG signal A are synchronized with a clock A to be written in a storage unit. On the other hand, a timing pulse B and a clock B are input to the pointer processing unit and new pointer values (V1a'–V1d')–(V4a'–V4d') are obtained from the phase difference between timing pulses A and B and the dropped pointer values (V1a–V1d)–(V4a– V4d). When a VT-G signal B in synchronization with a timing pulse B and a clock B is formed, using a clock that is controlled not to read the position of a timing (V1a'–V4d') into which the surplus byte in the prior new pointer values may be inserted, the four bundles of VT 1.5 signal in the storage unit are read as (a–d''').

Therefore, at a timing that a new timing is inserted, the VT 1.5 signal is not read and new pointer values (V1a'–V1d') are inserted. Thereafter, the VT 1.5 signal is read again (e'''–j''') by the prior clock. Repeating these processes, the pointer processing system of the present invention is kept on operating.

From the above, it can be seen that a synchronous payload pointer processing system in accordance with the present invention performs a pointer processing at an intermediate level and as is explained in the above embodiments, the pointer processing at the VT-G level with regard to the VT 1.5 signal may be applicable to that at the other signal level. For example, when the pointer processing of a STS-1 signal within a STS-N signal is performed at the level of a STS-1 signal, it is necessary to be provided with more than N pointer processing circuits, whereas when the pointer processing is performed at an intact level of a not separated STS-N signal, only one pointer processing circuit will do. Further, the same pointer processing may be performed at a step of a higher order multiplexed signal than the STS-N signal, or it can be performed at a step of each multiplexed signal in the other different multiplexed systems.

Since the payload pointer processing may be performed at a higher order level, it will be easily appreciated that a chain payload pointer processing will be dealt therewith. The chain payload pointer processing that is recommended by the specification of CCITT or SONET is regarded as a system such that a plurality of payloads are chained and a payload point may be processed as one body of a chain payload pointer. According to the present invention, since the pointer processing circuit is originally processed in a plurality of lumped processing circuits, it can be seen that the chain payload pointer processing circuit will be easily realized.

I claim:

1. A synchronous payload envelope pointer processing system in synchronous transmission equipment for transmitting information in SONET signals or CCITT signals, the processing system comprising:

a pointer detection unit for monitoring a group of pointer bytes in a receive multiplex signal applied to said pointer detection unit and for determining a group of pointer values included in the monitored group of pointer bytes, said receive multiplex signal being comprised of a plurality of multiplexed synchronous payload envelope signals, each associated with one of the pointer bytes;

a storage unit for storing payload data carried by the receive multiplex signal;

a write timing signal generator unit receiving a receive clock signal and generating a write clock signal and being coupled to said pointer detection unit and to said storage unit, said write timing signal generator unit supplying said write clock signal to said storage unit;

a read timing signal generator unit receiving a transmit clock signal and generating a read clock signal, said read timing signal generator unit being coupled to said storage unit and supplying said read clock signal thereto;

a phase difference counter unit receiving a receive frame timing signal and a transmit frame timing signal, and being coupled to said write timing signal generator unit and said read timing signal generator unit, said phase difference counter unit counting a phase difference between said receive frame timing signal and said transmit frame timing signal;

a phase comparator unit coupled to said write timing signal generator unit and said read timing signal generator unit for comparing a phase between said write clock signal and said read clock signal to produce a control signal;

a pointer addition unit coupled to said storage unit, said pointer detection unit, said phase difference counter unit, said read timing signal generator unit and said phase comparator unit, for processing said group of pointer values determined by said pointer detection unit, the phase difference counted by said phase difference counter unit and said control signal produced by said phase comparator unit to produce a new group of pointer values, and for adding overhead bytes including the new group of pointer values to payload data read from the storage unit to produce a transmit multiplex signal.

2. A processing system according to claim 1, wherein said pointer detection unit is provided with a determination circuit for determining said group of pointer values.

3. A processing system according to claim 2, wherein said write timing signal generator unit is activated by said receive clock signal to deliver said write clock signal to said phase difference counter unit, said pointer detection unit, said storage unit and said phase comparator unit.

* * * * *